(12) United States Patent
Dickerson et al.

(10) Patent No.: US 10,944,155 B2
(45) Date of Patent: Mar. 9, 2021

(54) STANDARD ANTENNA INTERFACE CONNECTOR ASSEMBLY

(71) Applicant: CommScope Technologies LLC, Hickory, NC (US)

(72) Inventors: Calvin J. Dickerson, Garland, TX (US); Duy Khanh Tran, Rowlett, TX (US); Michael F. Bonczyk, Anna, TX (US); John W. Orem, Allen, TX (US); Eddie Ray Bradley, Allen, TX (US)

(73) Assignee: CommScope Technologies LLC, Hickory, NC (US)

( * ) Notice: Subject to any disclaimer, the term of this patent is extended or adjusted under 35 U.S.C. 154(b) by 843 days.

(21) Appl. No.: 15/538,284

(22) PCT Filed: Jan. 13, 2016

(86) PCT No.: PCT/US2016/013232
§ 371 (c)(1),
(2) Date: Jun. 21, 2017

(87) PCT Pub. No.: WO2016/115240
PCT Pub. Date: Jul. 21, 2016

(65) Prior Publication Data
US 2017/0373378 A1    Dec. 28, 2017

Related U.S. Application Data

(60) Provisional application No. 62/102,873, filed on Jan. 13, 2015.

(51) Int. Cl.
*H01R 13/627*   (2006.01)
*H01Q 1/24*     (2006.01)
*H04B 5/00*     (2006.01)

(52) U.S. Cl.
CPC .......... *H01Q 1/246* (2013.01); *H04B 5/0012* (2013.01)

(58) Field of Classification Search
CPC ...... H01Q 21/28; H01Q 1/42; H01R 13/6275; H01R 13/6272; H01R 2103/00
(Continued)

(56) References Cited

U.S. PATENT DOCUMENTS 3,409,859 A * 11/1968 Krehbiel ............ H01R 13/6273
                                                      439/357
3,475,718 A * 10/1969 Hartz .................. H01R 13/743
                                                      439/357
(Continued)

FOREIGN PATENT DOCUMENTS

GB    2 421 364 A    6/2006

OTHER PUBLICATIONS

International Search Report, PCT International Application No. PCT/US2016/013232, dated Mar. 24, 2016.
(Continued)

*Primary Examiner* — Thanh Tam T Le
(74) *Attorney, Agent, or Firm* — Myers Bigel, P.A.

(57) ABSTRACT

A standard RF connector assembly for wireless communications antenna system. The RF connector assembly includes a first connector housing incorporating an RF connector, the housing including a first latch plate attached to the housing and has at least two toggle mounts. A toggle is attached to each toggle mount and each toggle includes a metal band pivotably attached to the toggle. A second connector housing incorporating a second RF connector includes a second latch plate attached to the second housing and has at least two tabs configured to be engaged by the metal bands to secure the first and second housing into latched engagement with each other.

15 Claims, 23 Drawing Sheets

(58) Field of Classification Search
USPC ......... 343/745, 872; 439/350, 352, 357, 578
See application file for complete search history.

(56) References Cited

U.S. PATENT DOCUMENTS

| | | | | |
|---|---|---|---|---|
| 3,651,446 A * | 3/1972 | Sadogierski | ......... | H01R 13/741 439/357 |
| 4,639,066 A * | 1/1987 | Shimamiya | ........ | H01R 12/7029 439/350 |
| 4,961,711 A * | 10/1990 | Fujiura | ............... | H01R 13/6275 439/357 |
| 5,004,430 A * | 4/1991 | DelGuidice | .......... | H01R 13/745 439/350 |
| 5,011,424 A * | 4/1991 | Simmons | ........... | H01R 13/6275 439/352 |
| 5,314,347 A * | 5/1994 | Colleran | .............. | H01R 13/633 439/350 |
| 5,613,870 A * | 3/1997 | Traver, Jr. | .......... | H01R 13/6273 439/352 |
| 5,685,743 A * | 11/1997 | Schmidt | ............. | H01R 13/6272 439/352 |
| 5,835,071 A * | 11/1998 | Phelps | ................... | H01Q 1/242 343/906 |
| 5,961,337 A * | 10/1999 | Kordes | .............. | H01R 13/4538 439/141 |
| 7,563,103 B1 * | 7/2009 | Hall | ....................... | H01R 24/50 439/581 |
| 7,867,008 B1 * | 1/2011 | Lin | .................... | H01R 13/6392 439/350 |
| 8,092,246 B1 * | 1/2012 | Santiago | ............ | H01R 13/6275 439/357 |
| 9,039,433 B2 * | 5/2015 | Barthelmes | .......... | H01R 13/629 439/248 |
| 2013/0065415 A1 | 3/2013 | Van Swearingen et al. | | |
| 2013/0065420 A1 | 3/2013 | Van Swearingen et al. | | |
| 2013/0065422 A1 | 3/2013 | Van Swearingen et al. | | |
| 2014/0179244 A1 | 6/2014 | Colapietro et al. | | |
| 2014/0315408 A1 | 10/2014 | Colapietro et al. | | |
| 2015/0126061 A1 | 5/2015 | Paynter | | |

OTHER PUBLICATIONS

Written Opinion of the International Searching Authority, PCT International Application No. PCT/US2016/013232, dated Mar. 24, 2016.

Sel, "240-Kanal-UKW-Sprechfunkerät FuG 7b—Bedienungsanleitung and Kurzbeschreibung", (Dec. 31, 1972) Retrieved from the Internet on Mar. 15, 2016: URL:http://www.moba-paffenholz.de/klaus-paffenholz.de/docs/bos-funk/testbilder/sel-7b-manual.pdf, 30 pp

* cited by examiner

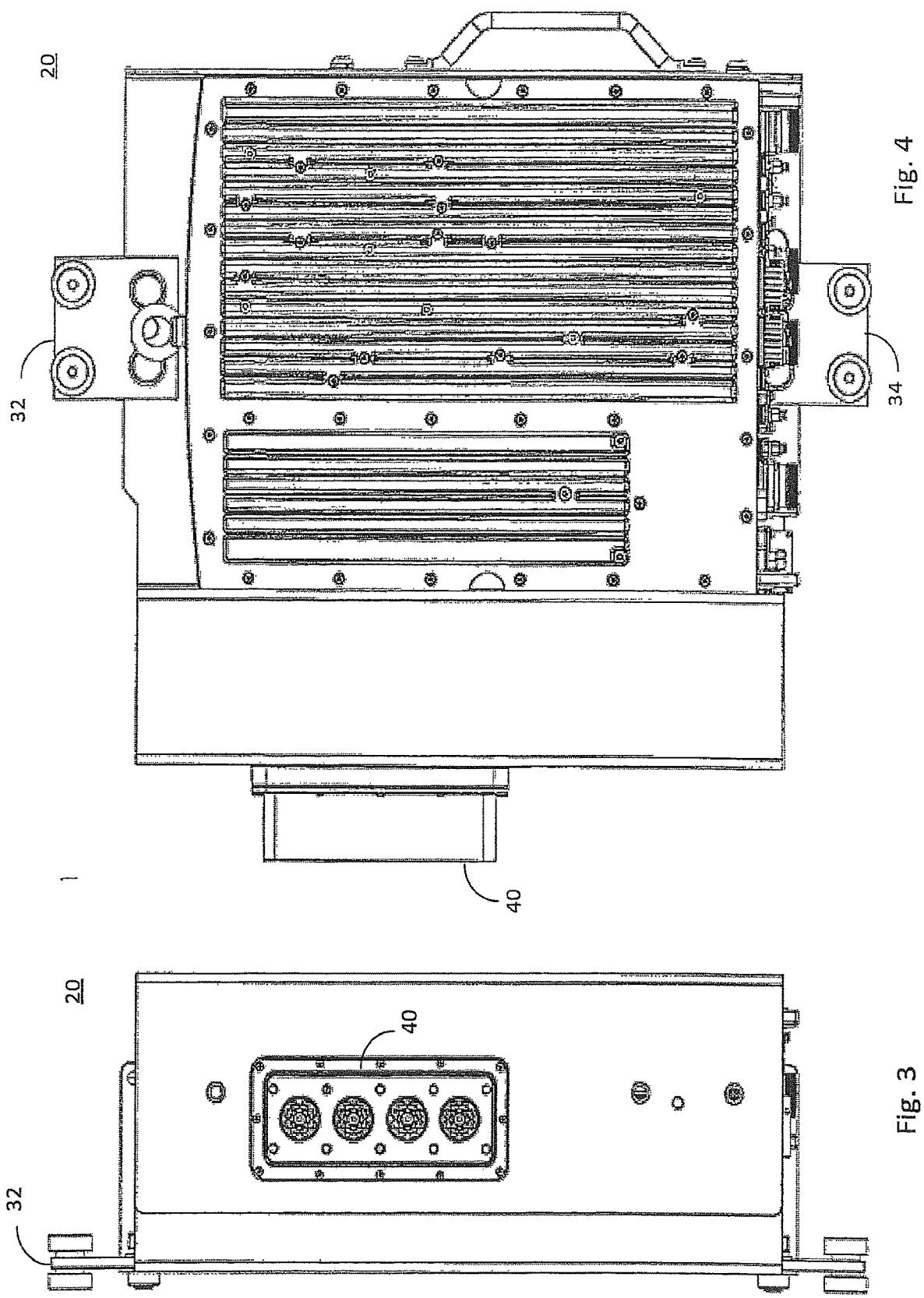

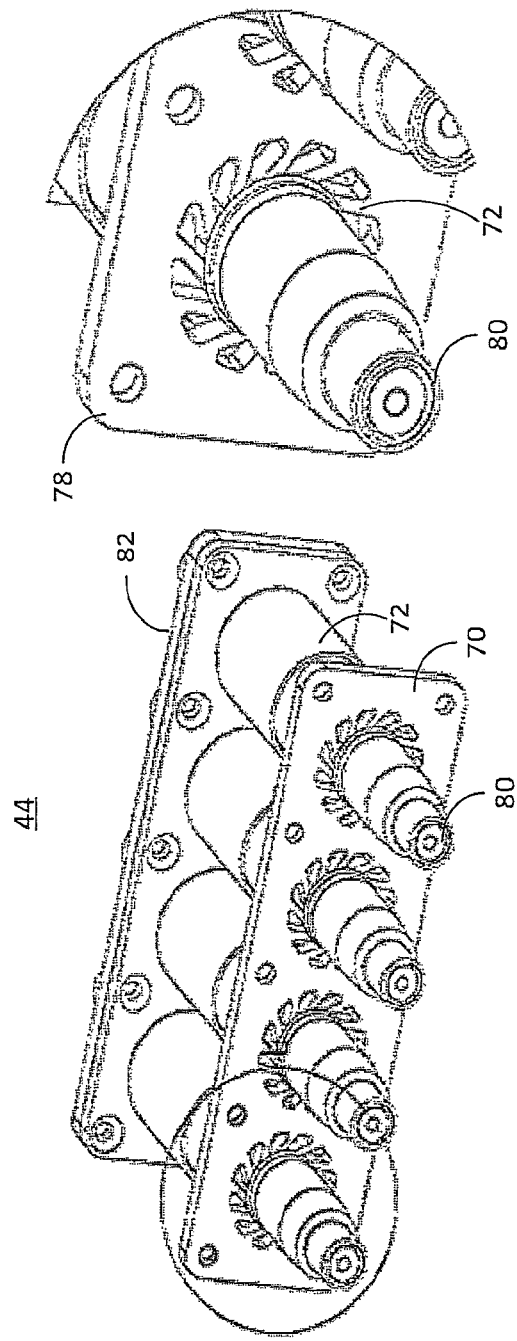

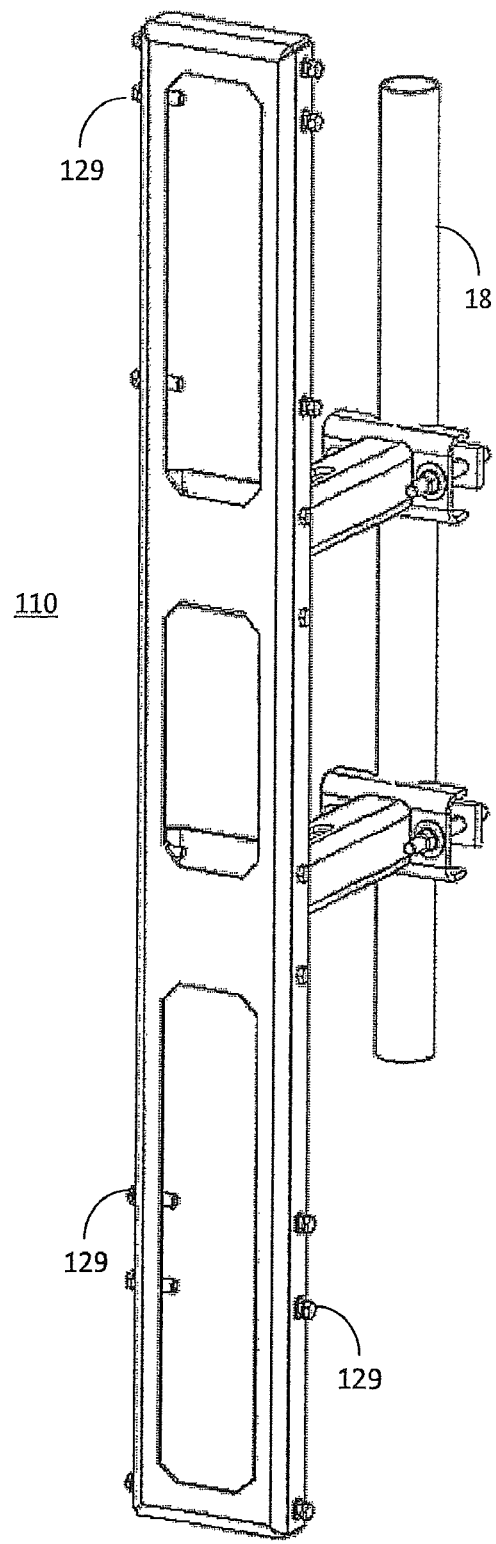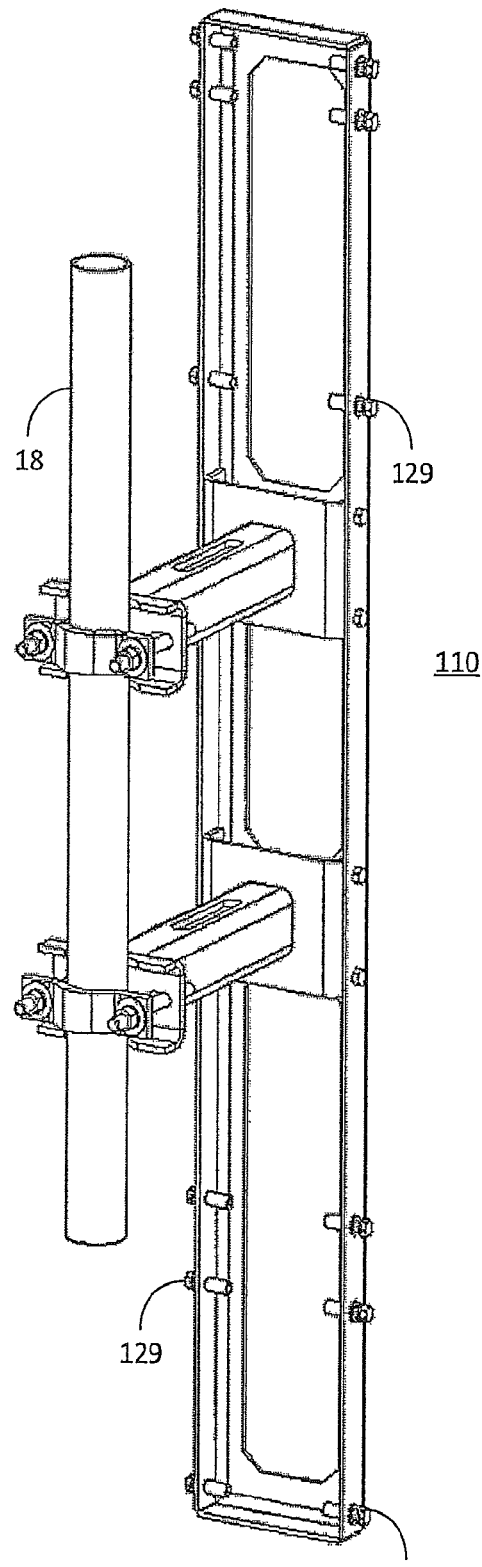
Fig. 9a
Fig. 9b

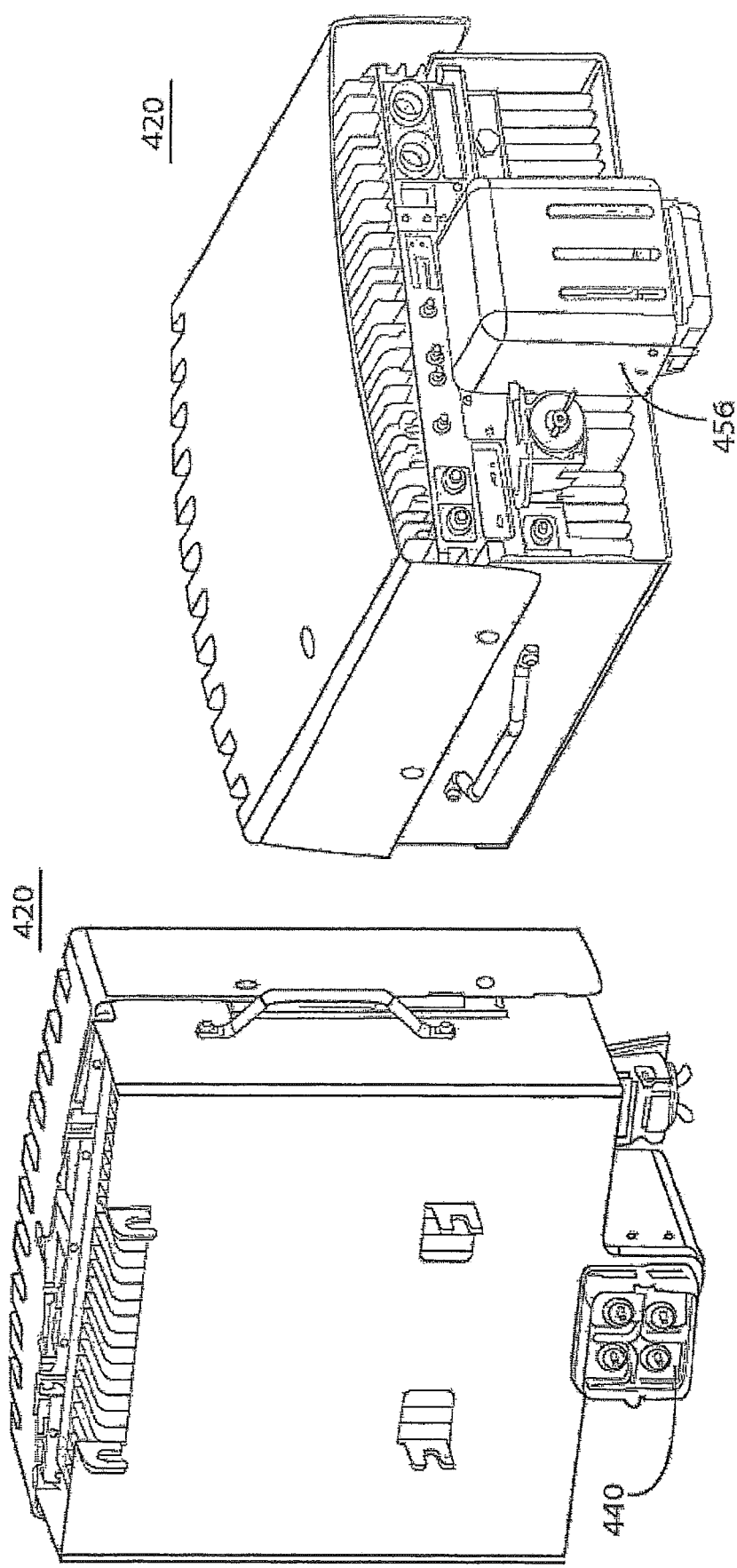

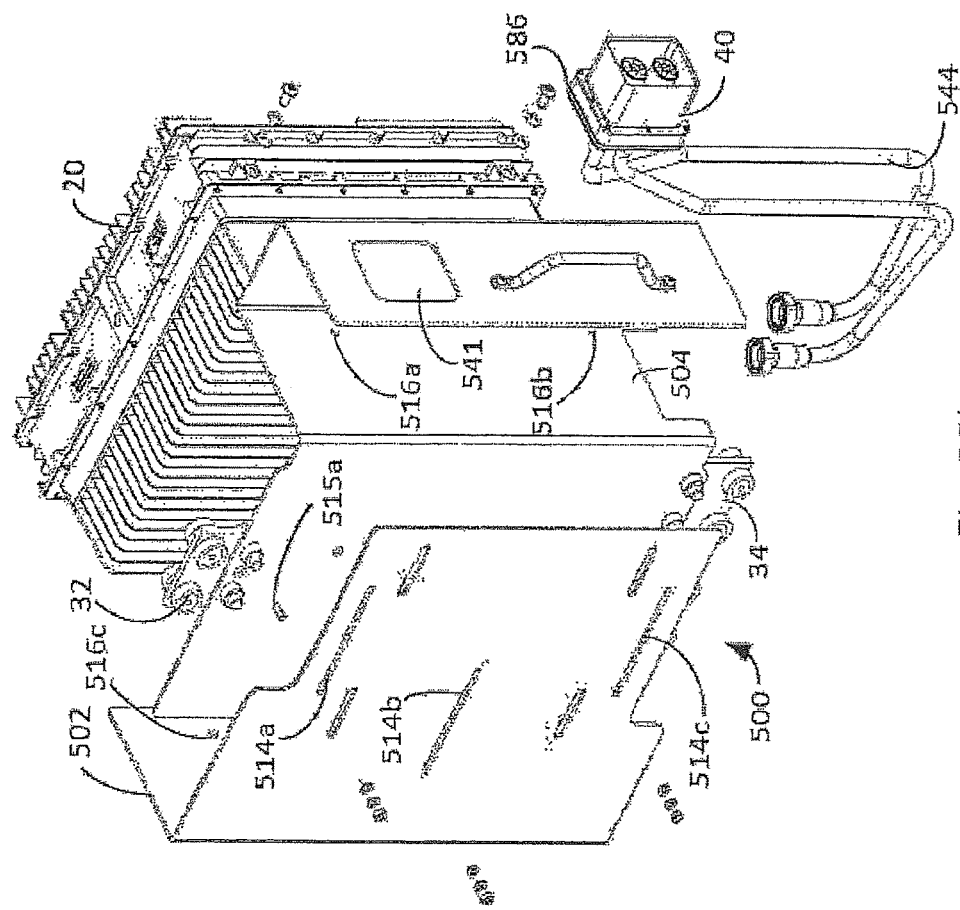
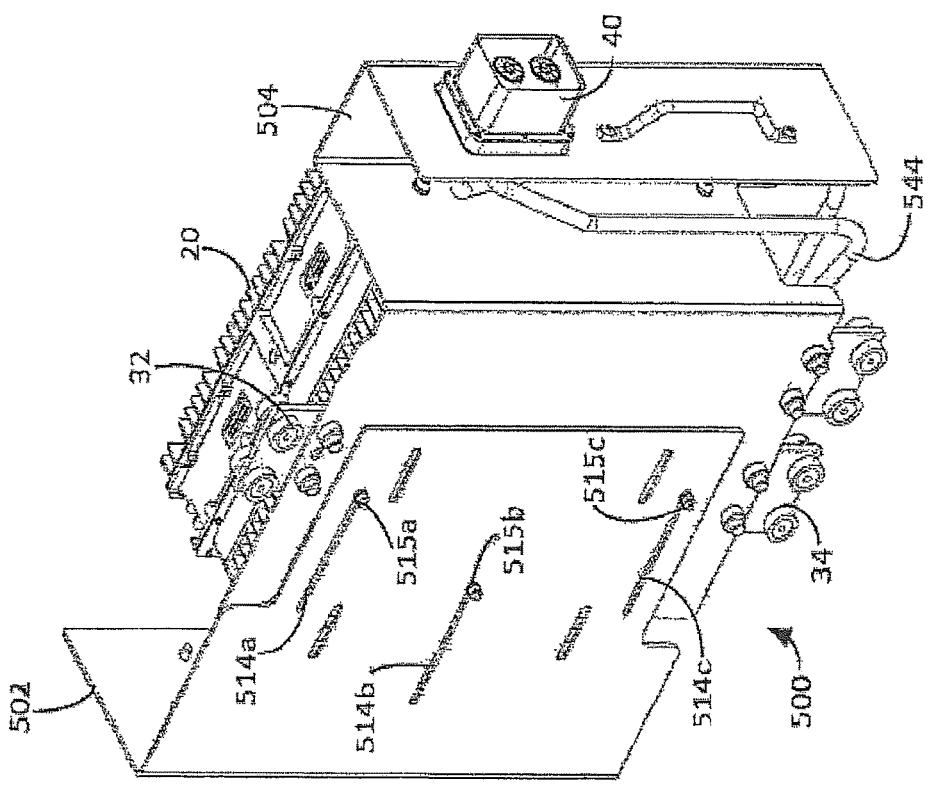

STANDARD ANTENNA INTERFACE CONNECTOR ASSEMBLY

CROSS REFERENCE TO RELATED APPLICATIONS

This application is a 35 U.S.C. § 371 national stage application of PCT International Application No. PCT/US2016/013232, filed Jan. 13, 2016, which itself claims priority to U.S. Provisional Patent Application No. 62/102,873, filed Jan. 13, 2015, the disclosure and content of both of which are incorporated by reference herein in their entireties. The above-referenced PCT International Application was published in the English language as International Publication No. WO 2016/115240 A1 on Jul. 21, 2016.

BACKGROUND

The present inventions relate generally to wireless communications. In particular, they relate to improvements in wireless base station antenna and radio deployments.

A traditional installation of a wireless radio network system mounted at the top of the tower consists of a remote radio head (RRH) and a separate antenna. These components are mounted in separate locations and are cabled together using jumper cables to pass the radio frequency (RF) signal between them. Such an installation decreases the performance of the radio network, creates complex and time consuming installations, and introduces opportunities for installation errors.

Current installations require multiple jumper cables and multiple mounting kits/hardware. This involves more installation time (approximately 12-15 hours per site). Jumper cables present RF losses and Passive Intermodulation products (PIM) performance issues. These issues degrade network performance, and add significant cost to the network operator to overcome. Jumper cables also require more weatherproofing, and additional capital expense and operating expense.

Since there is no common structure or installation method to mount the RRH and the antenna, it is up to the installation team to define the mounting method. This can result in installation errors, missing hardware, wrong cable lengths, and inadequate mounting hardware.

Once the antenna and RRH are mounted at the tower top, it is strictly up to the installer to cable and connect the components together correctly. The installer will need a schematic or wiring diagram to understand how such connections should be made. This introduces the possibility of installing cables at the wrong locations, improperly assembling connectors to the jumper cables, or not engaging them correctly. In addition, once connected connectors may partially or fully disengage due to vibrations, thermal cycling, etc. Thus, reliable, secure latching of the connections is desirable.

Solutions have been proposed to solve the limitations of the current system. For example, U.S. patent application Ser. No. 14/137,059, corresponding to U.S. Patent Application Publication No. US 2014/0179244 (which is incorporated by reference), describes a Standard Interface having a linear engagement structure and capacitive RF connectors. U.S. patent application Ser. No. 14/321,310, corresponding to U.S. Patent Application Publication No. 2014/0315408 (which is incorporated by reference), describes improvements to the capacitive connector blocks and adapter kits for adapting existing tower-mounted equipment to be used with a Standard Interface. While such solutions are marked improvements over conventional remote radio head installations, some applications may require greater reliability of the RF signal path. The RF connector latch assembly described herein may be combined with any of the embodiments of the incorporated patent applications to provide improved reliability.

SUMMARY OF THE INVENTION

An RF connector assembly according to one aspect of the invention includes a first connector housing having a first RF connector disposed within the housing and a first latch plate attached to the housing having at least two toggle mounts and a respective toggle attached to each respective toggle mount and each respective toggle including a band pivotally attached to the toggle. A second connector housing includes a second RF connector disposed within the housing and configured to mate with the first RF connector. A second latch plate is attached to the second connector housing and includes at least two tabs configured to be engaged by the bands to secure the first and second connector housing in latched engagement with each other.

BRIEF DESCRIPTION OF THE DRAWINGS

FIG. 3 is an end view of a remote radio head adapted for use in the first example of the present invention.

FIG. 4 is a side view of a remote radio head adapted for use in the first example of the present invention.

FIGS. 7a and 7b are perspective views illustrating certain details of connectors which may be used in connection with the first example of the present invention.

FIGS. 9a and 9b are perspective views of a standard antenna interface according to a second example of the present invention.

FIGS. 17a-17c illustrate a remote radio head adapted for use in another example of the present invention.

FIG. 23a-23b illustrate an embodiment of an adjustable mount assembly that is side mounted to a remote radio head.

DESCRIPTION OF EXAMPLES OF THE INVENTION

Figure 1:
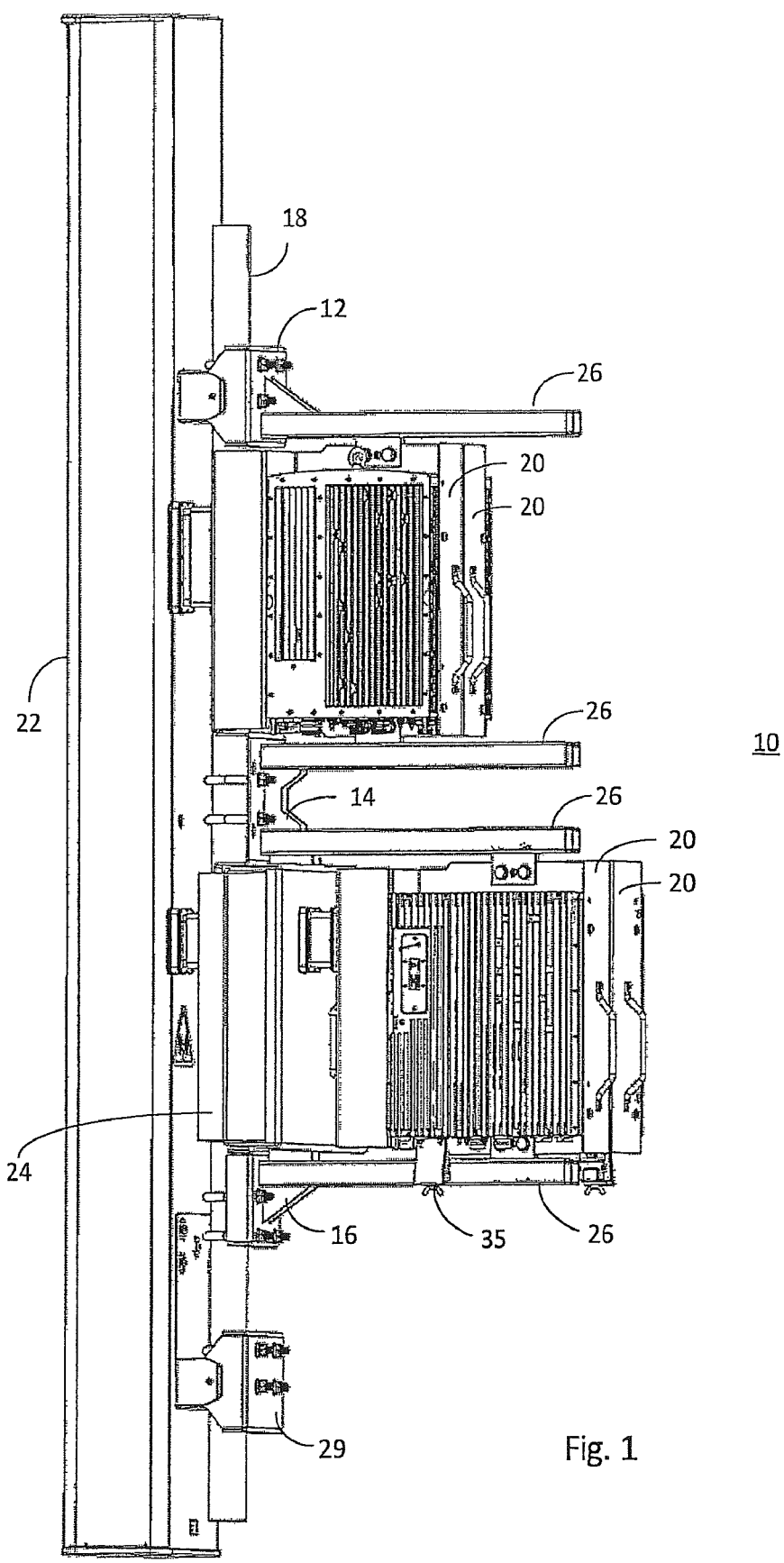
FIG. 1 is a perspective view of a first example of the present invention.

The present invention is described herein with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Many different embodiments are disclosed herein, in connection with the description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and sub combinations of the shall support claims to any such combination or subcombination.

A Standard Antenna Interface is described herein to overcome the limitations of a traditional RRH and antenna tower top installation. This invention creates a standard antenna interface with a connector latching mechanism that provides a reduced installation time, allows the installer to avoid directly touching/interfacing with the RF electrical path, and creates a PIM free interface. An RF connector latch is provided to improve reliability of the RF signal path.

The Standard Antenna Interface comprises of a standard interface structure, including antenna mounting brackets and RRH mounting structure, and a RF interconnection module. The standard interface structure acts as the mounting medium for both the antenna and the RRH. Both the antenna and RRH are mounted to their respective universal mounting structure. One mounting structure will receive the antenna and, optionally, all necessary interconnects, where the other bracket or mounting structure will receive the RRH and, optionally necessary interconnects. In embodiments where the Standard Interface Structure does not include RF interconnects, such RF interconnects are made directly between the antenna and the RRH. Each entity will mount directly to the standard interface structure and can be removed independently from each other. Preferably, the Standard Antenna Interface allows antennas and radios from different manufacturers to be coupled together in the field without adding jumper cables and/or ohmic connections.

Figure 2:
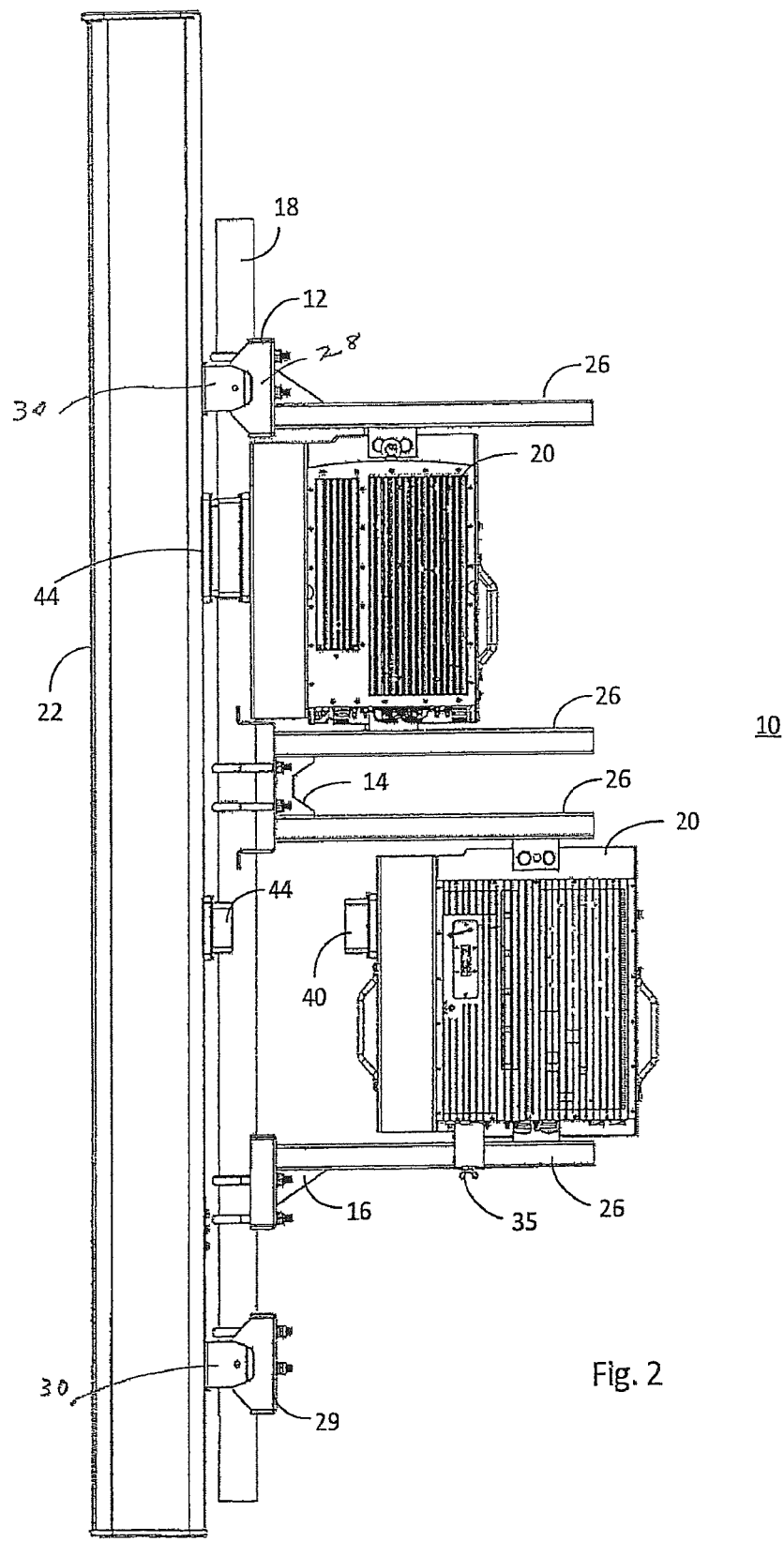
FIG. 2 is a side view of another aspect according to the first example of the present invention.

Referring to FIGS. 1 and 2, a first example of a Standard Antenna Interface 10 is disclosed. In this example, an Upper Tower Mount 12, and Middle Tower Mount 14 and a Lower Tower Mount 16 are mounted on a Mounting Pole 18. The Upper Tower Mount 12, and Middle Tower Mount 14 and a Lower Tower Mount 16 are configured to mechanically interface with a plurality of Remote Radio Heads 20 and an Antenna 22. Preferably, the Upper Tower Mount 12, and Middle Tower Mount 14 and a Lower Tower Mount 16 are configured to mechanically interface with a Diplexer 24 placed between a Remote Radio Head 20 and the Antenna 22.

The example illustrated in FIGS. 1 and 2 allows for the installation of up to four Remote Radio Heads 20. In an alternative example (not illustrated), when one or two Remote Radio Heads 20 are desired, the Middle Tower Mount 14 may be omitted.

The Upper Tower Mount 12 and the Lower Tower Mount 16 each include a Linear Guided Support 26. In the illustrated example, the Linear Guided Supports 26 comprise tracks that are configured to receive a roller trolley. However, alternative track and low friction car slide structures are within the scope of this invention and may be substituted. In this example, the Upper Tower Mount 12 includes an Antenna Mount 28. An additional Antenna Mount 29 is included on the Mounting Pole 18. The Antenna 22 includes Brackets 30, which include slots to engage Antenna Mount 28 and Antenna Mount 29. Middle Tower Mount 14 includes two Linear Guided Supports 26. The Linear Guided Supports 26 are on the opposite side of the Mounting Pole 18 from the Antenna 22 and extend away from the Antenna 22, as shown.

Alternatively, the Lower Tower Mount 16 may be structurally the same as Upper Tower Mount 12, but is inverted when mounted. The Upper Tower Mount 12 and the Lower Tower Mount 16 each include an Antenna Mount 28 in this example.

Referring to FIG. 3 and FIG. 4, the Remote Radio Head 20 includes an Upper Low Friction Car 32 and a Lower Low Friction Car 34. The Upper Low Friction Car 32 and a Lower Low Friction Car 34 each engage a respective Linear Guided Support 26. For example, when a Remote Radio Head 20 is installed in a lower location on the Standard Interface, the Upper Low Friction Car 32 engages a Linear Guided Support 26 of the Middle Tower Mount 14 and the Lower Low Friction Car 34 engages the Linear Guided Support 26 of the Lower Tower Mount 16. In the illustrated example, the Upper Low Friction Car 32 and the Lower Low Friction Car 34 each comprise a wheeled trolley. However, alternative low friction non-wheeled cars are also contemplated and may be substituted for the wheeled trolleys.

Each Remote Radio Head 20 includes a RRH Connector 40. The Antenna 20 includes a plurality of integrated RF Interconnection Modules 44 designed to engage a respective mating RRH Connector 40. Alternatively, the RF Interconnection Module 44 may be located on the Standard Antenna Interface 10, and the Antenna 20 may be provided with a connector.

Once the Upper Low Friction Car 32 and the Lower Low Friction Car 34 are engaged in their respective Linear Guided Supports 26, the Remote Radio Head 20 may then slide into engagement with Antenna 22. Specifically, the RRH connector 40 is mated with its respective RF Interconnection Module 44. The Remote Radio Head 20 may mate directly with the antenna, or optionally, a Diplexer 24 may be included between two Remote Radio Heads 20 and the Antenna 22. The Remote Radio Head 20 may be locked into place with Lock 35.

Figure 8:
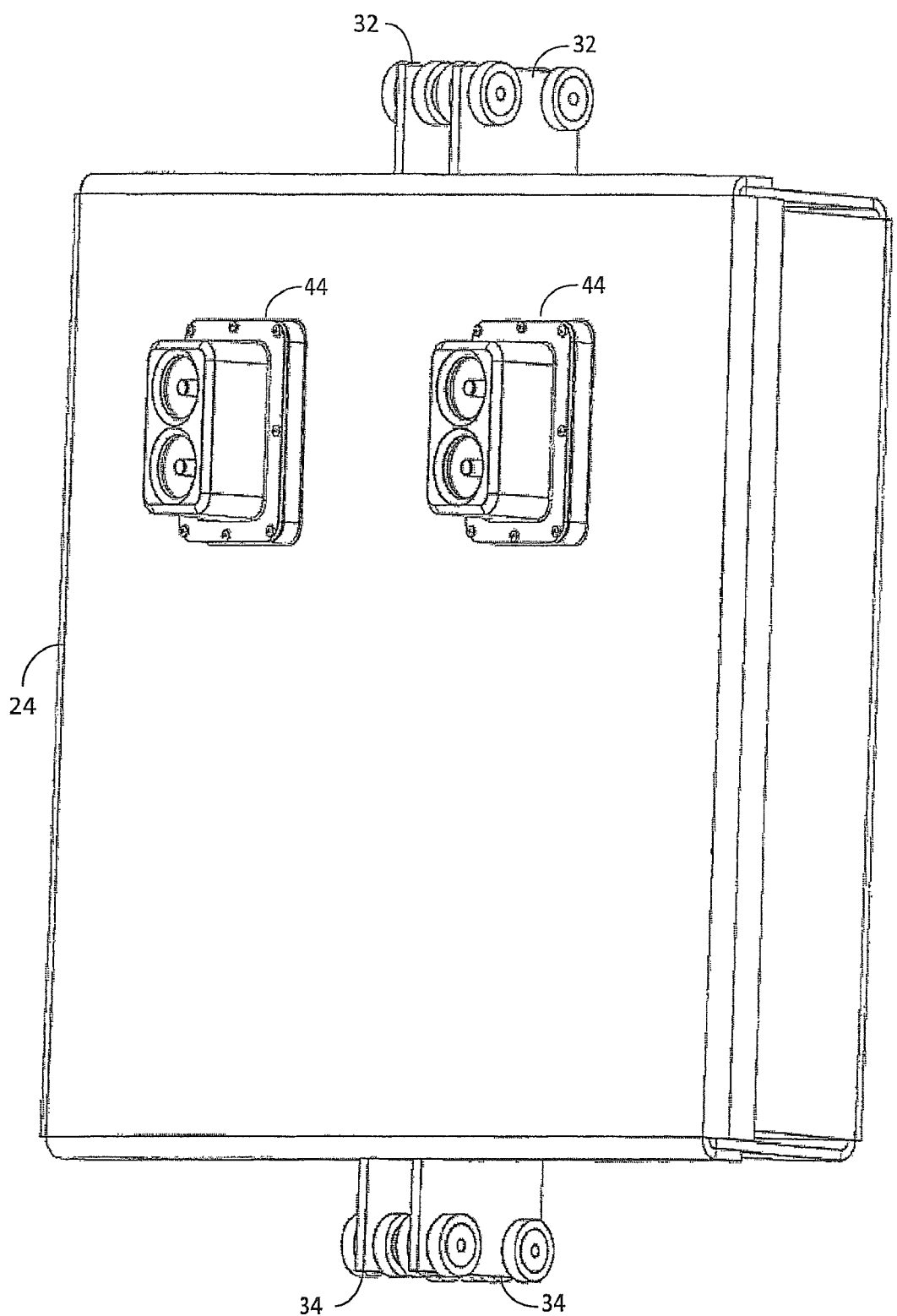
FIG. 8 is a perspective view of a diplexer connector adapted for use in the first example of the present invention.

When a Diplexer 24 is used, the Diplexer 24 will include two sets of RF Interconnection Modules 44 facing the Remote Radio Heads 20 (See FIG. 8). The Diplexer 24 also includes one RRH Connector 40 facing the Antenna 22. The Antenna 22 may be configured to have a single RF Interconnection Module 44 facing the Diplexer 24. The Diplexer 24 may include a pair of Upper Low Friction Cars 32 and a pair of Lower Low Friction Cars 34 such as shown in FIG. 8. In addition to Remote Radio Head 20 and Diplexer 24, additional types of tower-mountable equipment, such as filters, may be accommodated by the Standard Antenna Interface 10.

An assembly may comprise as few as one antenna and one Remote Radio Head 20. However, as illustrated in the figures, each Linear Guided Support 26 may include two channels to accept two Remote Radio Heads 20, and there may be more than one pair of Linear Guided Supports 26 for each Antenna 22. In the illustrated examples, there may be four Remote Radio Heads 20 coupled to the Antenna 22.

The example of FIGS. 1-4 enable straight-in, linear engagement of the RF connectors. This allows for an improved design of blind-matable, capacitively coupled RF connectors to be employed. An example of such an engagement is illustrated in FIGS. 5 and 6.

Figure 6:
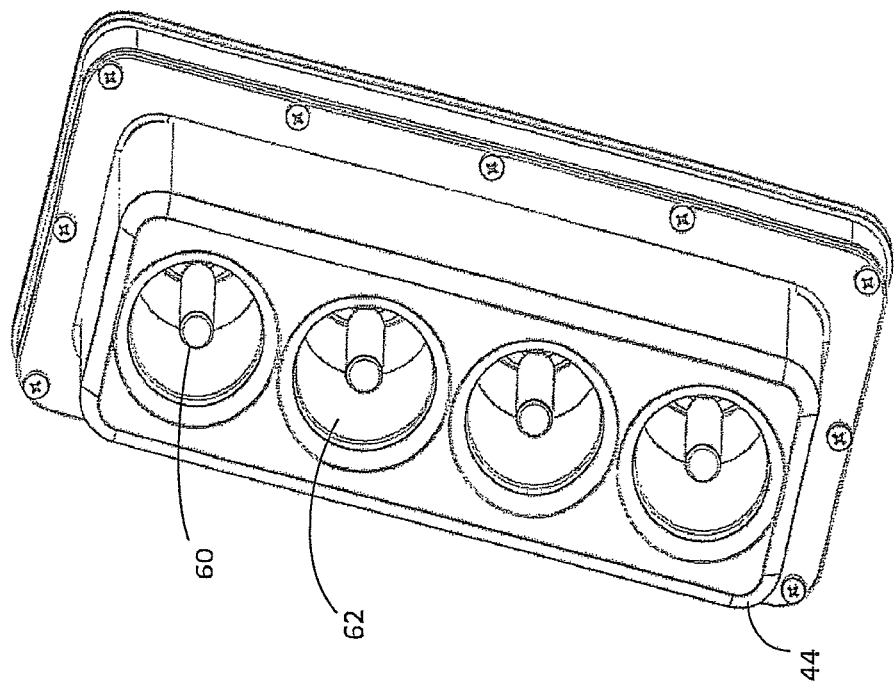
FIG. 6 is a perspective view of an antenna connector adapted for use in the first example of the present invention.
Figure 5:
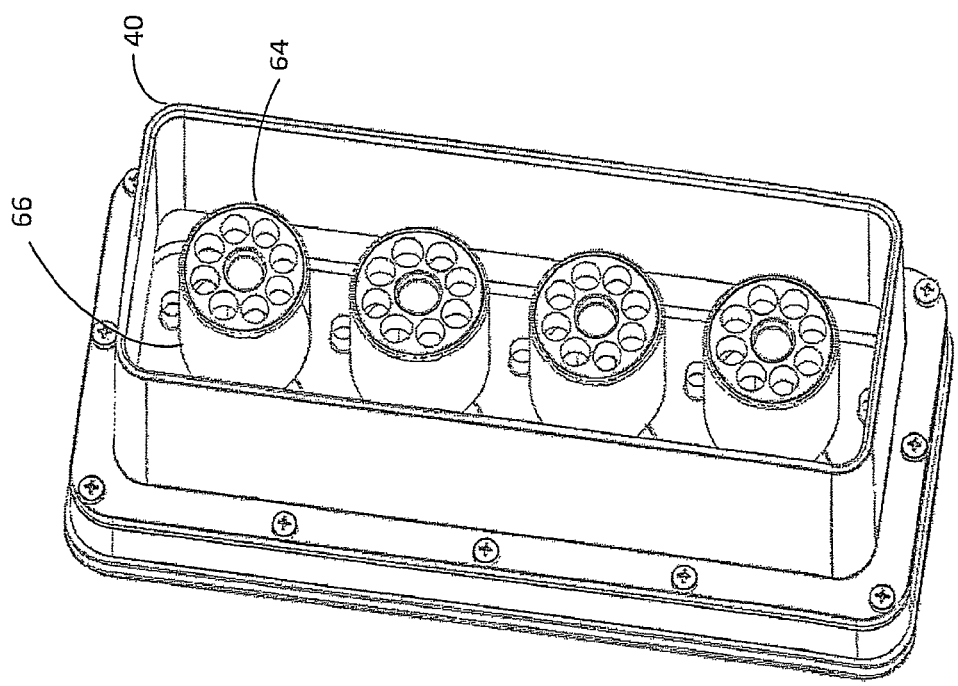
FIG. 5 is a perspective view of a remote radio head connector adapted for use in the first example of the present invention.

As illustrated in FIGS. 5 and 6, RF Interconnection Module 44 and RRH Connector 40 may comprise a blind mate connector of coaxial construction. In one example, the RF Interconnection Module 44 may include a central conductor extension having a generally Cylindrical Post 60 and an Outer Conductor Extension 62. The Cylindrical Post 60 may be covered by a dielectric layer, such as one formed of a polymeric shrink sleeve. The RRH Connector 40 may include a Central Conductor Extension 64 that is adapted to receive the Cylindrical Post 60 of the RF Interconnection Module 44, and an Outer Conductor Extension 66 configured to fit within the Outer Conductor Extension 62. A dielectric layer overlies the Outer Conductor Extension 66. The dielectric layers prevent an ohmic connection between the conductor extensions and ensure that the coupling is capacitive, reducing the possibility of Passive Intermodulation (PIM).

The RF Interconnection Module 44 may include a float plate to improve alignment of capacitive, blind mate connectors. Referring to FIGS. 7a and 7b, portions of an Interconnection Module 44 including a Float Plate 70 are illustrated. The float plate 70 may receive blind mated coaxial connectors within each opening; four such interconnections, designated at 72 illustrated in FIGS. 7a and 7b. The float plate 70 is typically mounted to a rigid structure, such as a back of an antenna, that includes openings that align with the openings in the float plate 70. The openings in the rigid structure are sufficiently large that they do not interfere with flexure of the fingers normal to the main body panel 78. Exemplary environments in which float plates may be employed with blind-matable connectors are discussed in U.S. Patent Publication No. 2013/0065415 to Van Swearingen et al., the disclosure of which is hereby incorporated herein by reference in its entirety.

As can be understood with reference to FIGS. 7a and 7b, as a connector 80 is inserted into the float plate 70, the fingers 72 can flex to help to compensate for any misalignment of the connector 80 relative to its mating connector 82. Such misalignment is not uncommon due to minor tolerance differences in the sizes of the connectors 80, 82 and their components.

While a rolling, straight-in engagement is advantageous, another example employs a pivoting, axially guided engagement. Referring to FIGS. 9a, 9b, 10a and 10b, the Standard Antenna Interface 110 mounts away from the pole or the wall and houses the Antenna 122 and Remote Radio Head 120 on one side of the pole. In this example, the Standard Antenna Interface 110 is constructed out of formed sheet metal. However, the Standard Antenna Interface 110 may also be constructed out of metal rectangular tubing. As in the example above, an RF Interconnection Module 144 is integrated into Antenna 122 (FIG. 10a).

Figure 10B:
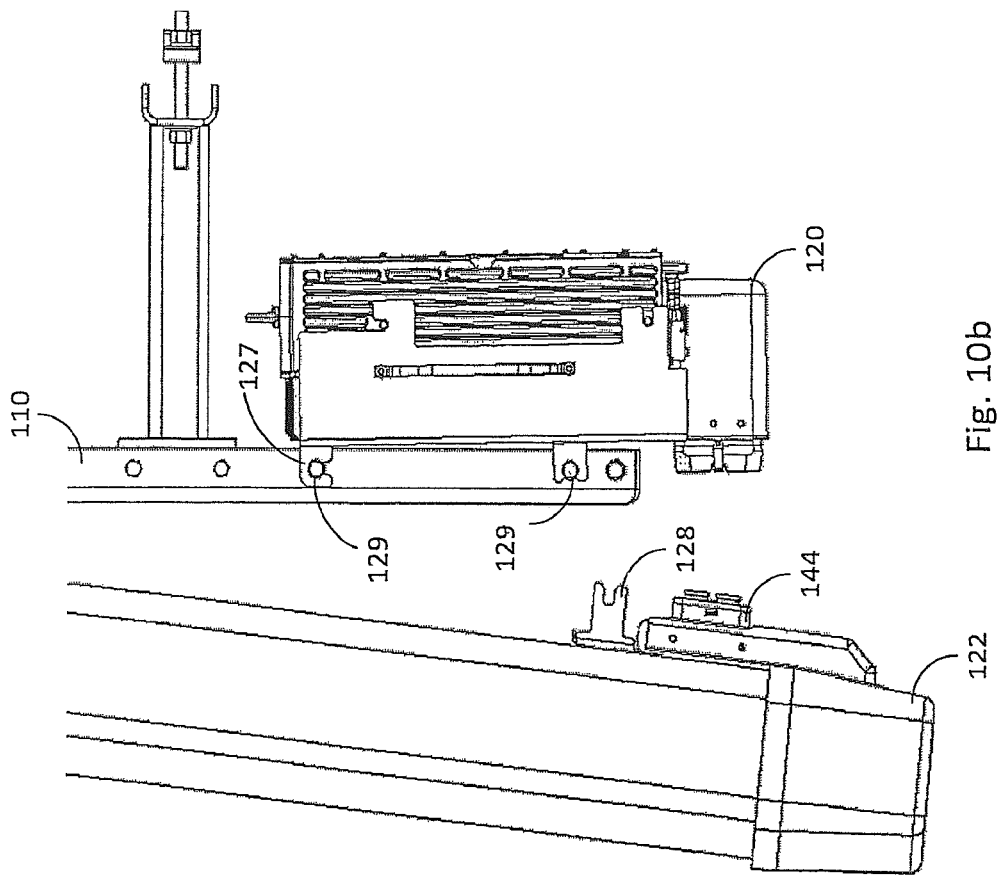
FIGS. 10a and 10b are side views of the standard antenna interface of the second example.
Figure 10A:
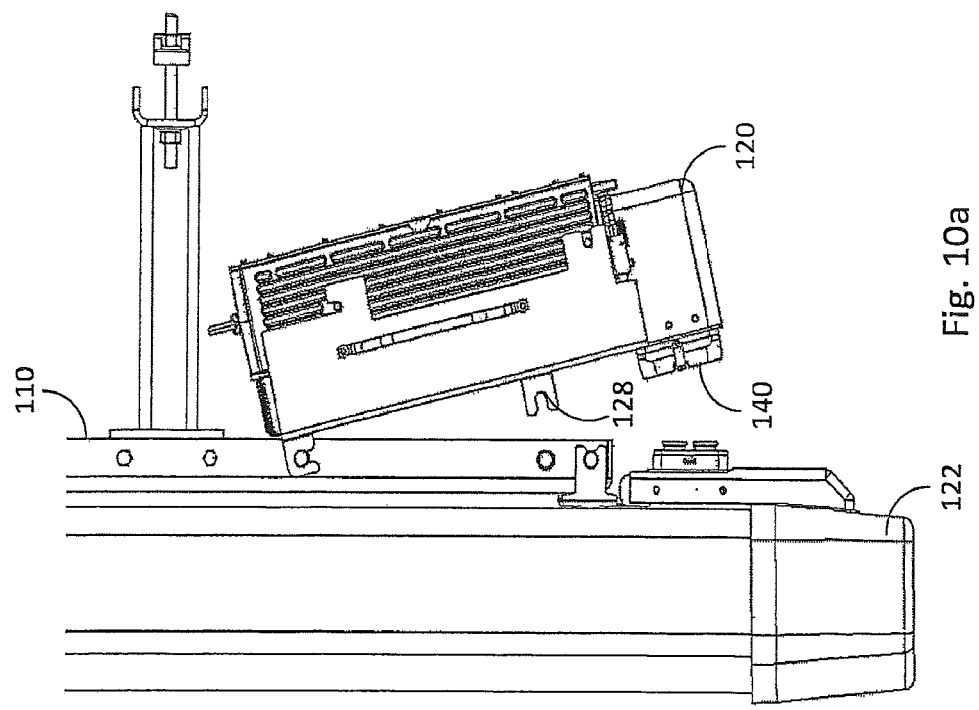

Referring to FIGS. 10a and 10b, a Remote Radio Head may be connected to the Standard Antenna Interface 110. The Remote Radio Head 120 includes mounting a hooked Mounting Bracket 127 and a slotted Mounting Bracket 128. The Standard Antenna Interface 110 includes Pins 129, which comprise axially guided support structure. The hooked Mounting Bracket 127 and a slotted Mounting Bracket 128 engage the Pins 129 of the Standard Antenna Interface (FIG. 9a), and allow the Remote Radio Head 120 to rotate into engagement (FIG. 9b). In another example, The Standard Antenna Interface 110 may be configured receive two or more Remote Radio Heads 120. The Antenna 122 also has a hooked Mounting Bracket 127 (not illustrated) and a slotted Mounting Bracket 128 that engages Pins 129 and allows Antenna 122 to be rotated into engagement in a similar manner.

The Remote Radio Head 120 may be installed and/or removed from the Standard Antenna Interface 110 without moving the Antenna 122 (10a). Similarly, the Antenna 122 may be installed and/or removed from the Standard Antenna Interface 110 without moving the Remote Radio Head 120 (10b). In another example, the hooked Mounting Bracket 127 and the slotted Mounting Bracket 128 may be replaced with a single piece mounting bracket. The linear guided support structure and the axially guided support structure may also be used in combination. For example, an antenna may be mounted using the axially guided support structure, such as Pins 129 and corresponding Hooked Mounting Bracket 127, and tower mountable equipment may be installed using Linearly Guided Supports 26 and Low Friction Cars 32, 34.

Figure 11:
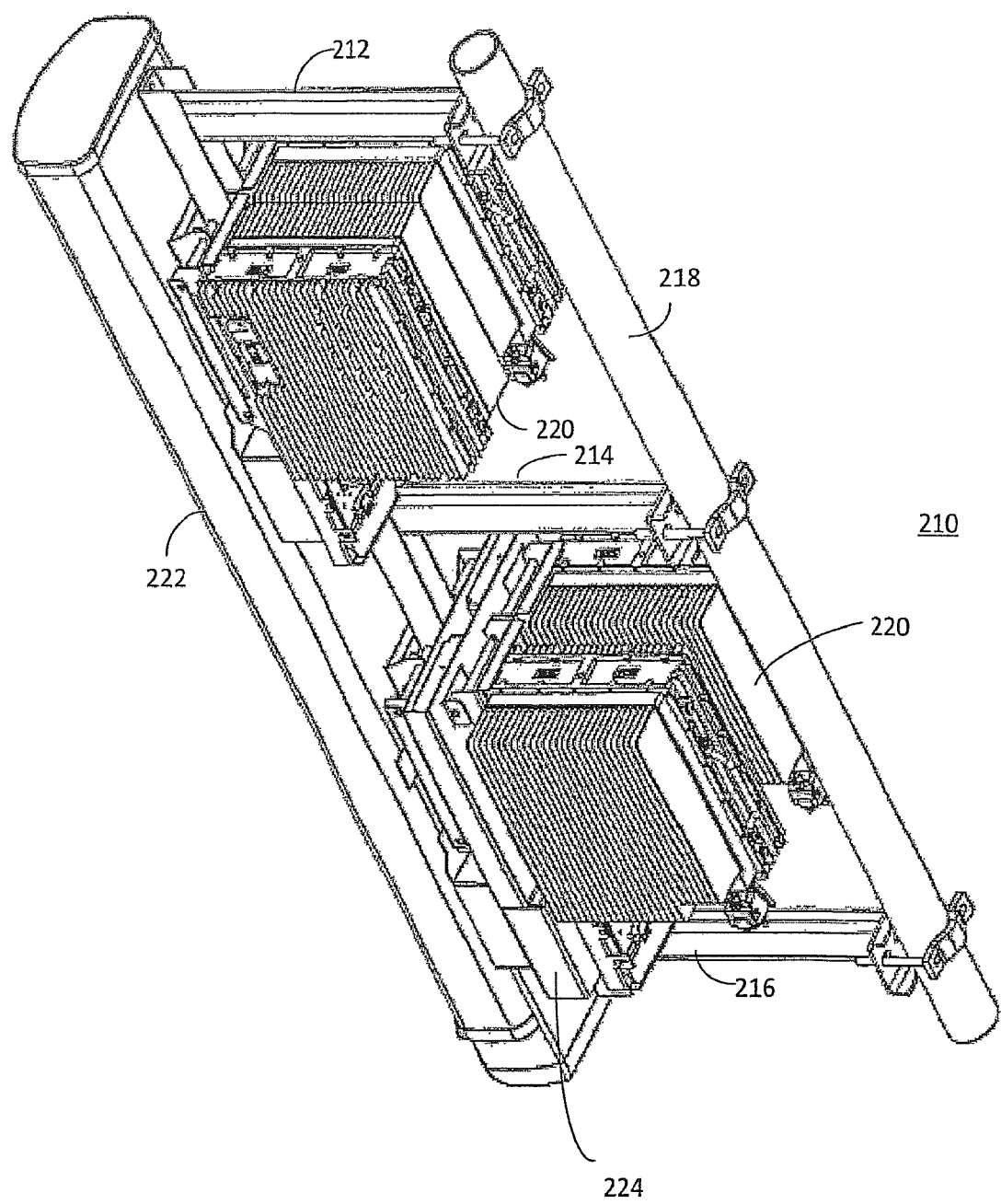
FIG. 11 is a perspective view of a third example of the present invention.
Figure 12:
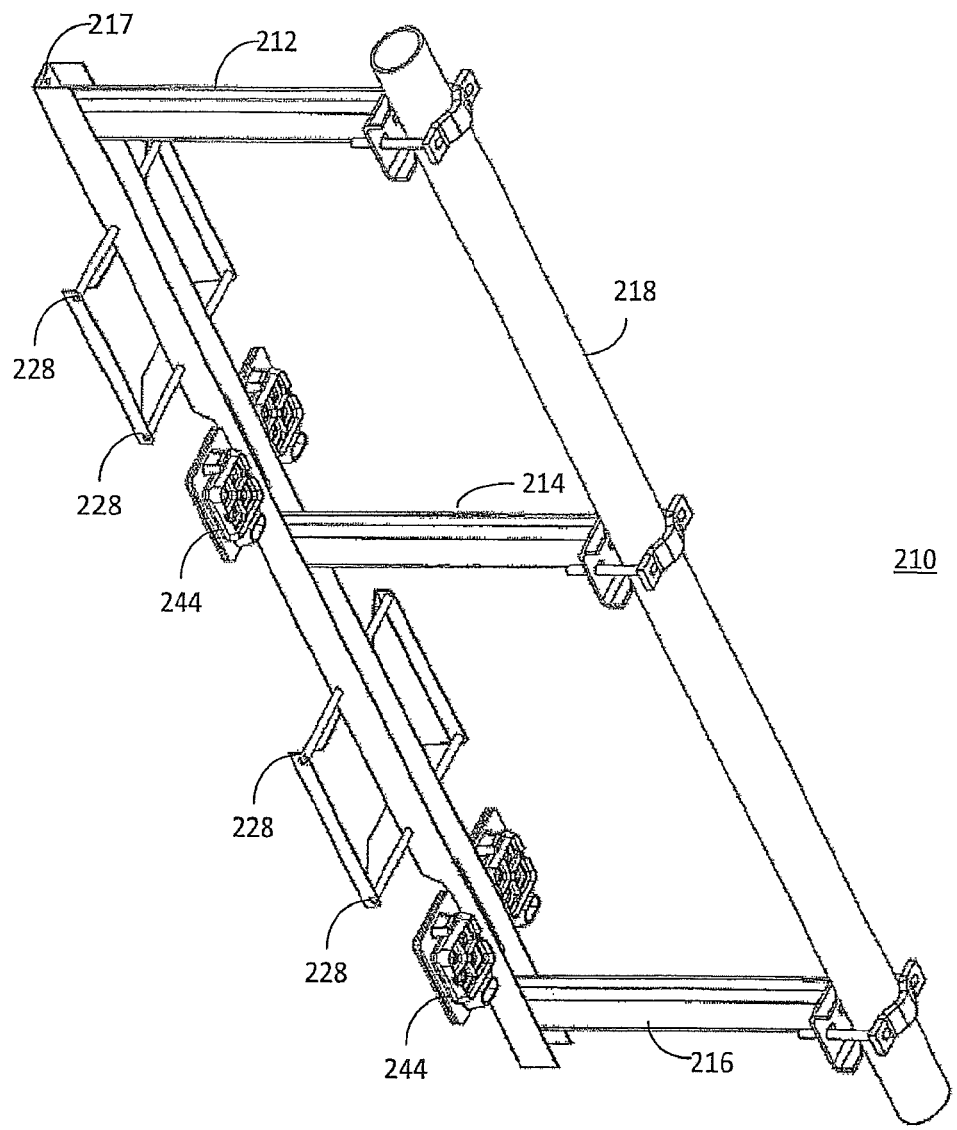
FIG. 12 is a perspective view of a standard antenna interface according to the third example of the present invention.

Referring to FIGS. 11 and 12, a perspective view of an additional example is illustrated. In this example, the Standard Antenna Interface 210 accommodates an Antenna 222 and up to four RRH Remote Radio Heads 220. In this example, the Standard Antenna Interface 210 is mounted to a pole. The Standard Antenna Interface 210 includes Cross Members 212, 214, and 216, and a Vertical Member 217.

Figure 13:
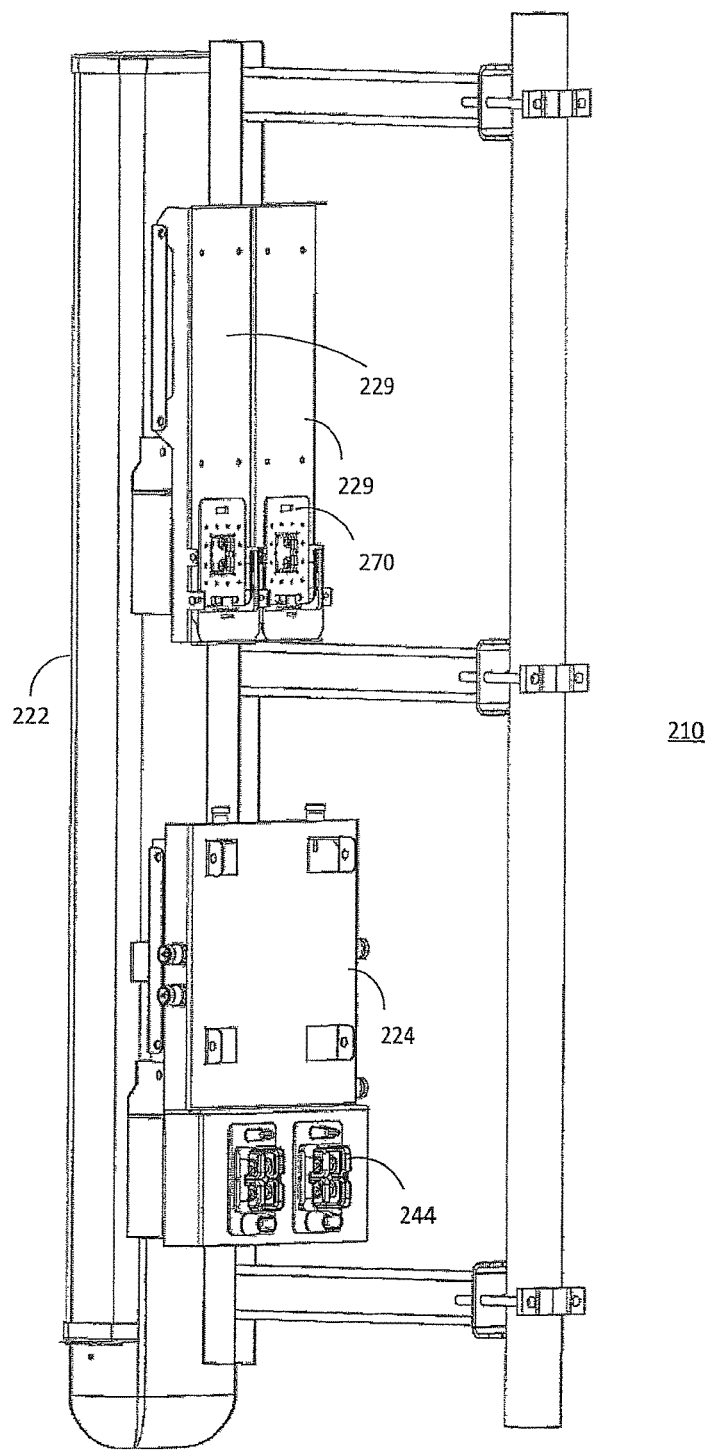
FIG. 13 is a perspective view of the third example of the present invention with additional components.
Figure 14:
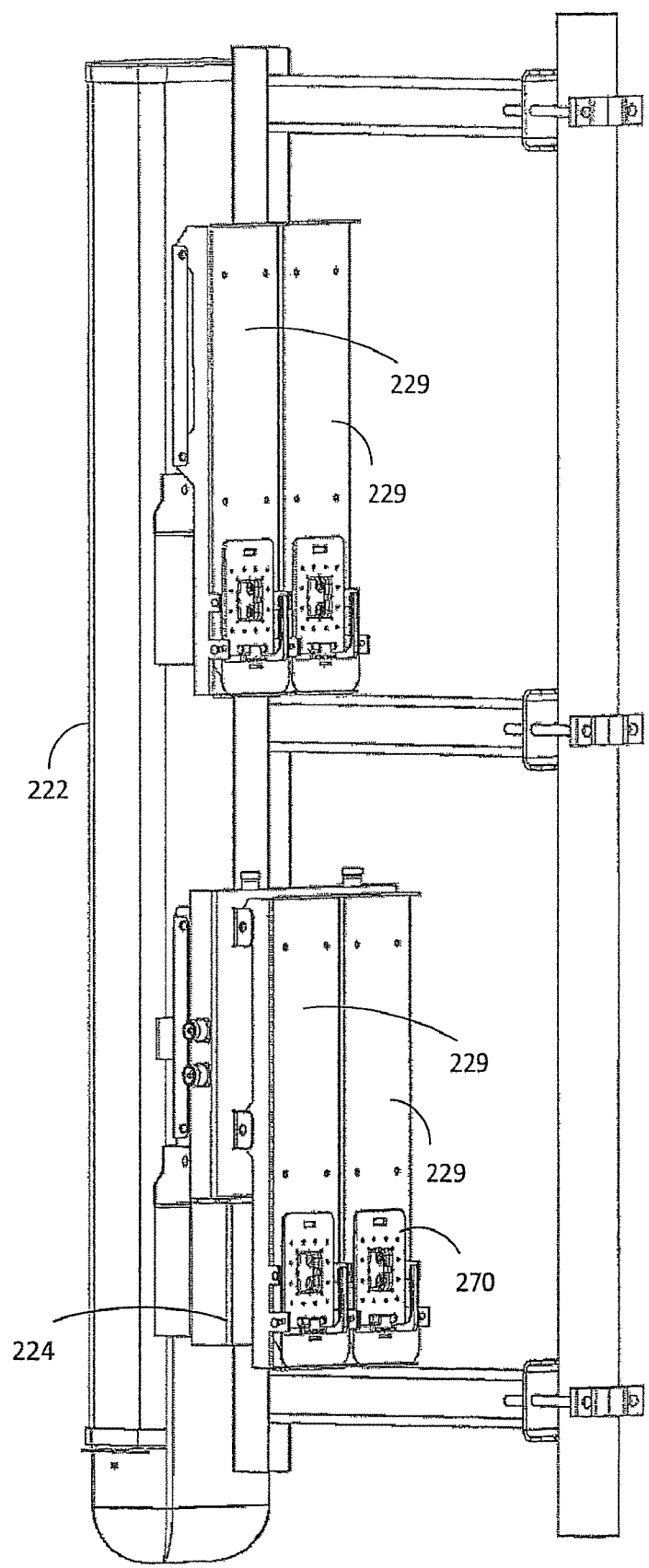
FIG. 14 is a perspective view of the third example of the present invention with additional components.

Referring to FIG. 12, the Standard Antenna Interface 210 includes Mounting Points 228 for the Antenna 222 and RF Interconnection Modules 244. Referring to FIG. 13, an Antenna 222 mounted to the Standard Antenna Interface 210. Mounting Brackets 229 for receiving Remote Radio Heads 120 are also installed on the Standard Antenna Interface 210 in an upper position. Float Plates 270 may be included on the Mounting Brackets 229. Additionally, an optional Diplexer 224 is mounted on the Standard Antenna Interface 210. FIG. 14 continues the example of FIG. 13, with the inclusion of Mounting Brackets 229 being installed on the Diplexer 224. The Remote Radio Heads 220 may be mounted on the Diplexer 224 in the same way that they would be mounted directly to the Standard Antenna Interface 210. The Mounting Brackets 224 include an RF Interconnection Module 244, which interfaces with Antenna Connector 242 and connectors on the Remote Radio Head (not illustrated).

The installation of the Diplexer 224 on the lower mounting brackets is just one example; a Diplexer 224 may be included on the upper mounting brackets, the lower mounting brackets, both mounting brackets, or omitted altogether. This flexibility in optionally including a diplexer is an advantage of this example.

The RF Interconnection Module 244 comprises a blind mate RF connector system that provides 7/16 DIN type RF performance in a blind mate approach for fast and robust component interfacing. The RF Interconnection Module 244 may include capacitively coupled interfaces and/or connectors such as those described in U.S. patent application Ser. No. 13/672,965 (corresponding to U.S. Patent Application Publication No. 2013/0065422), Ser. No. 13/673,084 (corresponding to U.S. Patent Application Publication No. 2013/0065420) and Ser. No. 13/673,373 (corresponding to U.S. Patent Application Publication No. 2013/0065415), which were filed on Nov. 9, 2012, and the disclosures of which are incorporated by reference.

Figure 15A:
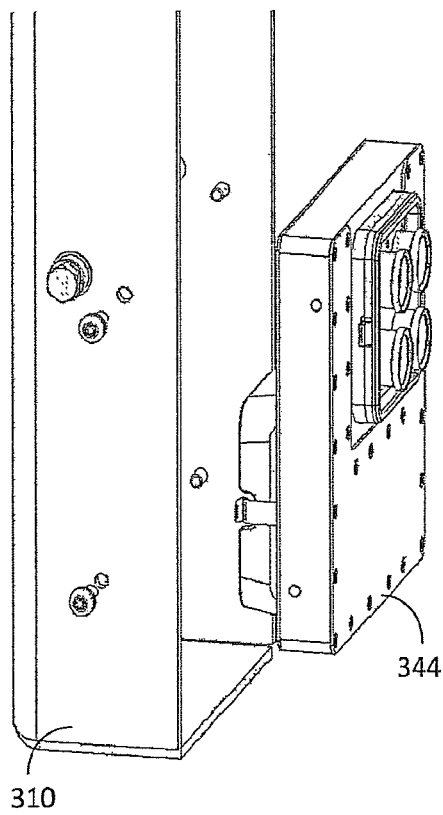
FIGS. 15a-15c illustrate a combination of features from the second and third examples of the present invention.
Figure 15B:
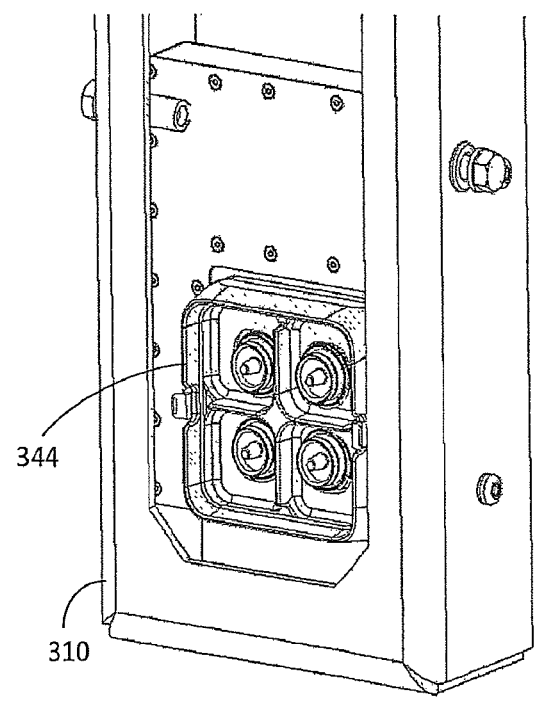
Figure 15C:
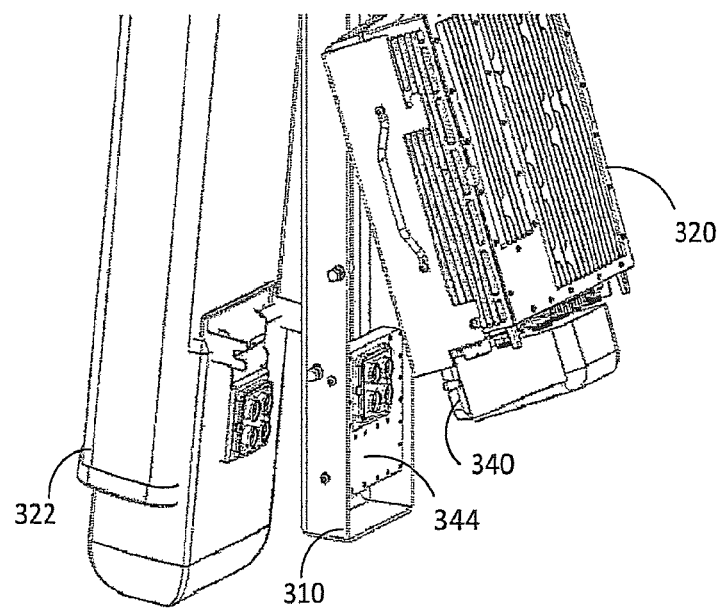

Referring to FIGS. 15a, 15b, and 15c, an example of a Standard Antenna Interface 310 including an RF Interconnection Module 344 is illustrated. RRH Connector 340 of Remote Radio Head 320 engages one side of the RF Interconnection Module 344, and Antenna Connector 320 of Antenna 322 engages the other side of the RF Interconnection Module 344.

Figure 16B:
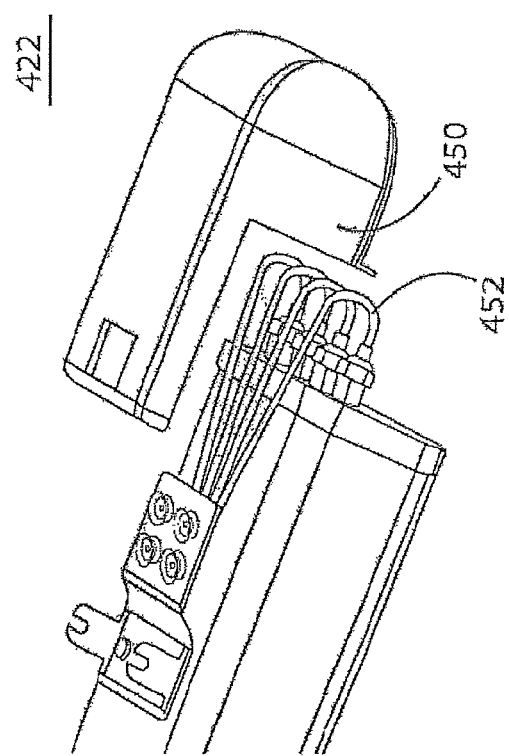
FIGS. 16a-16b illustrate an antenna adapted for use in another example of the present invention.
Figure 16A:
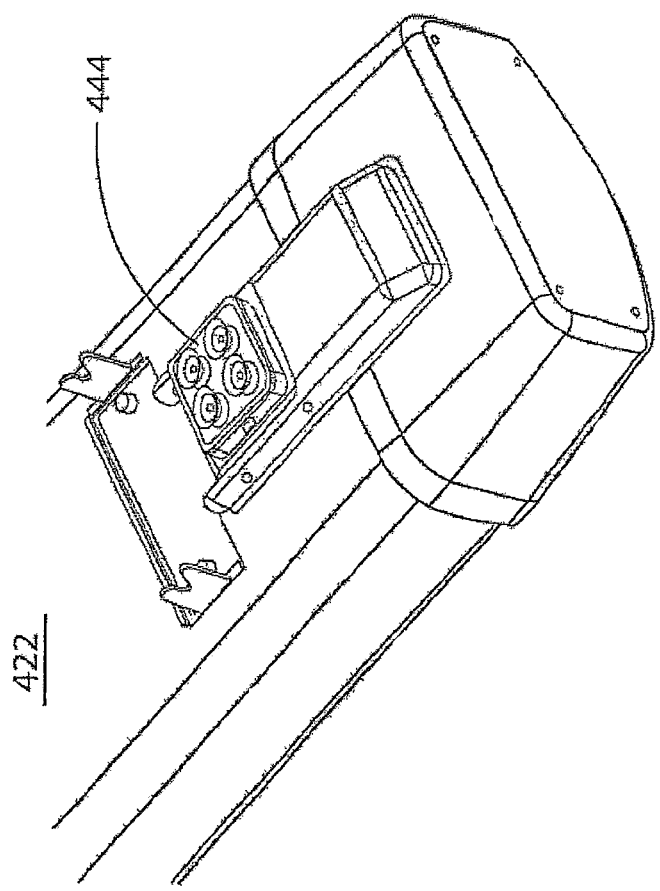
Figure 17C:
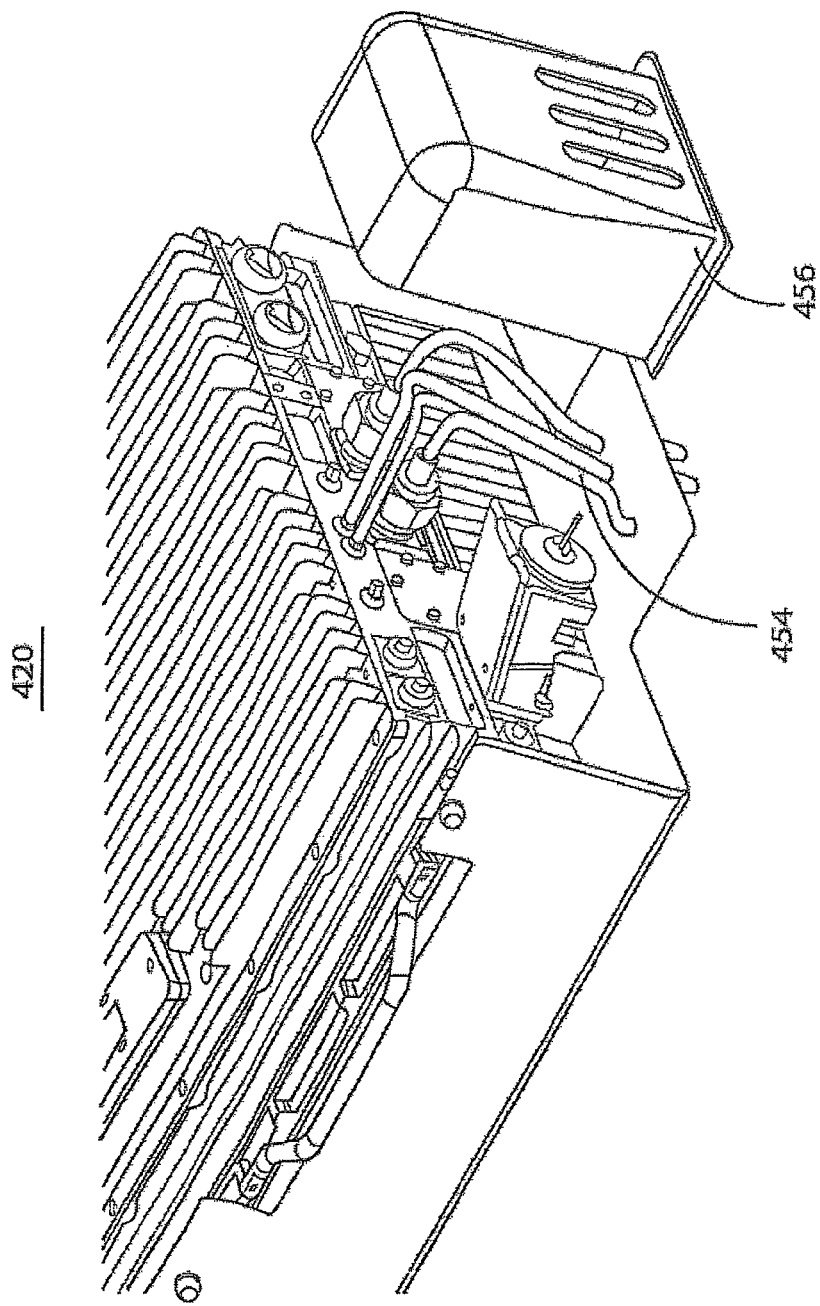

Referring to FIGS. 16a-16b and 17a-17c, examples of an Antenna 422 and a Remote Radio Head 420 including RF Interconnection Module 444 and RRH Connector 440 are illustrated. FIG. 16b illustrates RF jumper cables 452 connected from a bottom of an Antenna 422 to an RF interconnector module 444. Similarly, FIG. 17c illustrates RF jumper cables 454 connected from an RRH 420 to a RRH Connector 440. Jumper cables 452 and 454 may include metal-to-metal ohmic connectors on the one hand for attachment to the RRH 420 or antenna 440 and capacitive connectors on the other hand for attachment to the RRH Connector 440 or RF Interconnection Module 444. In these examples, installation of the RF Interconnection Module 444 and RRH Connector 440 occurs prior to traveling to the deployment site so that the harness and all jumper cabling 452 and 454 (in FIGS. 16b and 17c) can be tested for RF path integrity and concealed behind a covers 450 and 456 (in FIGS. 16b, 17b and 17c). Such concealment prevents an installer from touching or otherwise interfacing with this RF path and may provide an aesthetically pleasing look.

Figure 18:
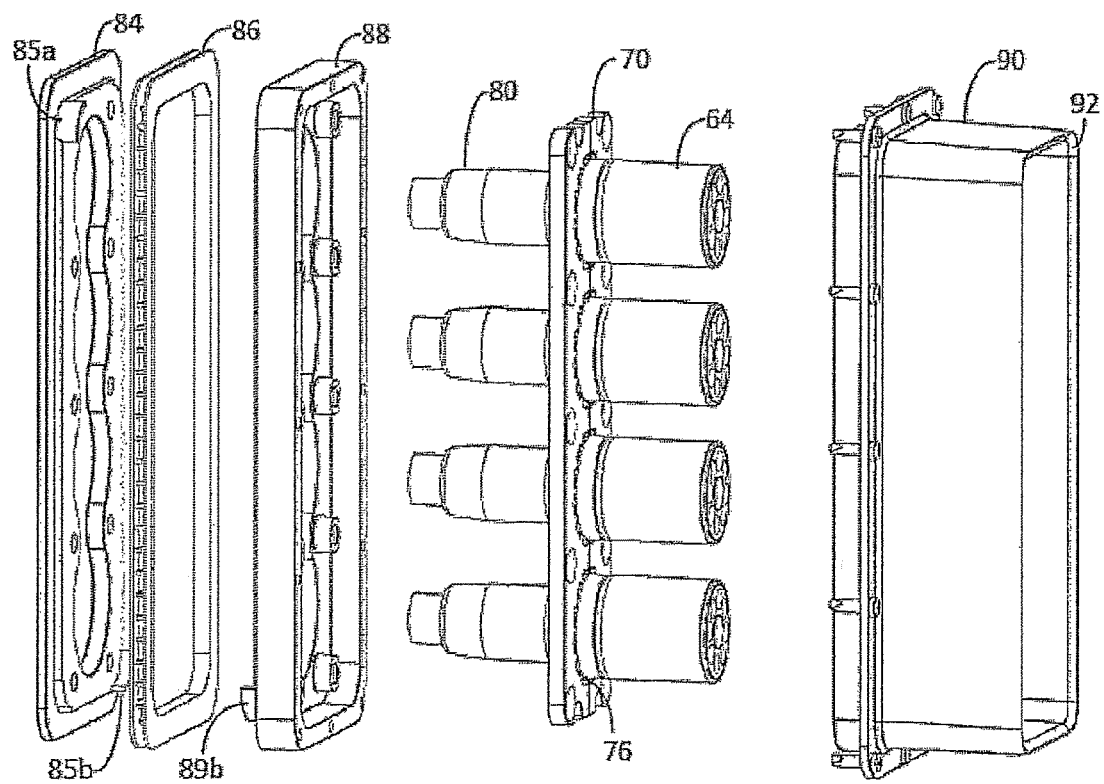
FIG. 18 is an exploded view of the RRH Connector illustrated in FIG. 5.
Figure 19:
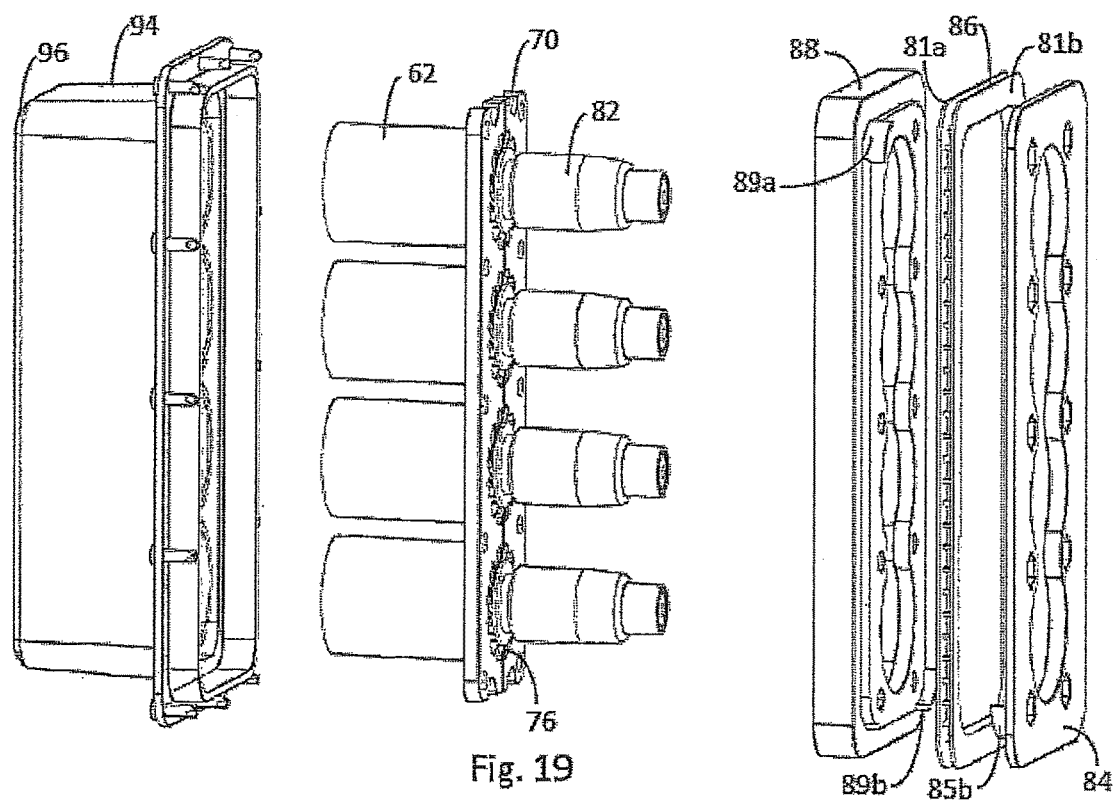
FIG. 19 is an exploded view of the RF Connector shown in FIG. 6.

FIG. 18 is an exploded view of the RRH Connector 40 illustrated in FIG. 5. FIG. 19 is an exploded view of the RF Connector 44 shown in FIG. 6. The RRH Connector 40 comprises a connector housing 90, capacitive connectors 64, a float plate 70 (see FIGS. 7a and 7b), and a float assembly comprising float shells 84 and 88 and a float gasket 86. The float gasket 86 may be an elastomeric material. Float shell 84 may include a first flange 85a and a second flange 85b (also shown in FIG. 19) adapted to engage float shell 88. Similarly, float shell 88 may include a first flange 89a and a second flange 89b (also shown in FIG. 18) adapted to engage float shell 84. When assembled, flanges 85a, 85b, 89a, and 89b operate to secure float gasket 86 in a space between the float shells 84 and 88 that is dimensioned to be about the thickness of the float gasket 86. The float plate 70 allows the capacitive connectors 64 to move with respect to the connector housing 90, such as by the flexure of fingers 76 as described above with respect to FIGS. 7a and 7b. The float gasket 86 allows the connector housing 90 to move with respect to a surface on which the RF connector 40 is mounted, as described below with respect to FIGS. 20, 21, 22a, 22b. 23a and 23b.

Similarly, the RF Connector 44 comprises a connector housing 94, capacitive connectors 62, a float plate 70 (see FIGS. 7a and 7b), and a float assembly comprising float shells 84 and 88 and a float gasket 86. Again, the float plate 70 allows the capacitive connectors 62 to move with respect to the connector housing 94, and the float gasket 86 allows the connector housing 90 to move with respect to a surface on which the RF connector 40 is mounted. The connector housings 90 and 94 may include corresponding bevels 92 and 96 to facilitate alignment of the housings 90 and 94 and their associated capacitive connectors 64 and 62.

Figure 21:
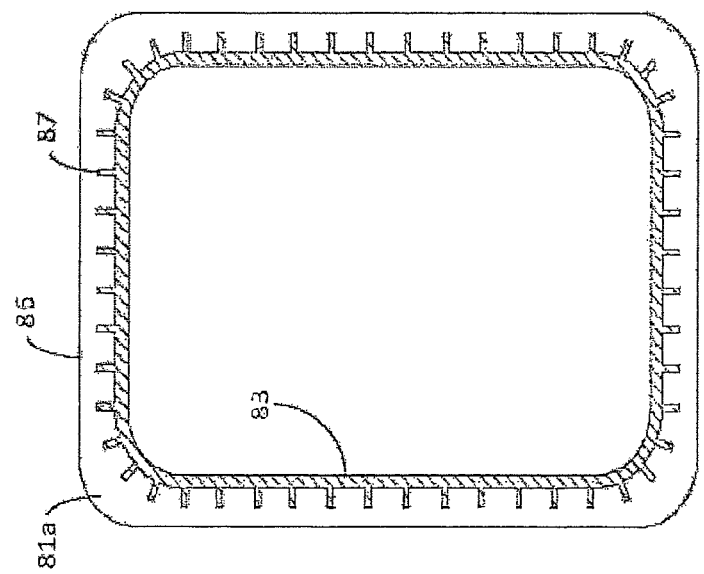
FIG. 21 is a cross section of an embodiment of a float gasket.
Figure 20:
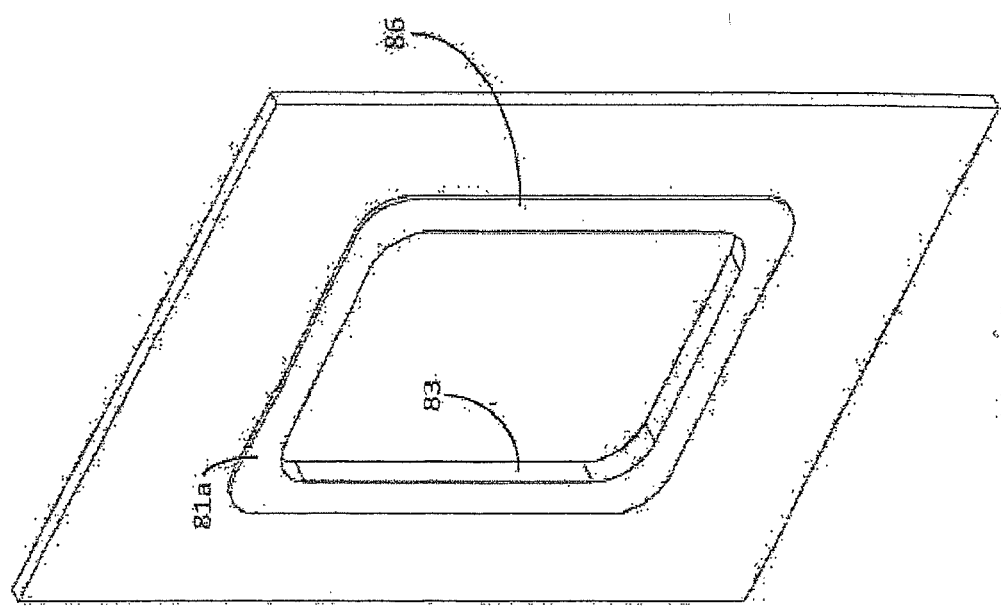
FIG. 20 is a perspective view of an embodiment of a float gasket installed in an opening of a portion of a panel.

Referring to FIGS. 20 and 21, one embodiment of a float gasket 86 is illustrated in more detail. FIG. 20 is a perspective view of a float gasket 86 installed in an opening of a portion of a panel. The float gasket 86 includes a first flange portion 81a and a second flange portion 81b (see FIG. 19) separated by a middle portion 83. FIG. 21 is a cross section of the float gasket 86 to illustrate a first flange 81a and ribs 87. First and second flanges 81a and 81b are dimensioned to be larger than an opening in which the float gasket 86 is to be installed. The middle portion 83 includes a plurality of outer ribs 87. The ribs 87 extend outwardly from the middle portion 83 and are dimensioned to engage an inner periphery of the hole in which the float gasket 86 is mounted. The float gasket 86 and/or ribs 87 may be compressed slightly, which allows the connector shell to "float" within the opening on the surface to which the RRH connector 40 or RF connector 44 is mounted. In practice, a float gasket 86 is installed in an opening, float shells 84 and 88 are installed around the float gasket 86, a float plate 70 and capacitive connectors 64 or 62 are installed, and finally the connector housing 90 or 94 is installed.

Figure 22B:
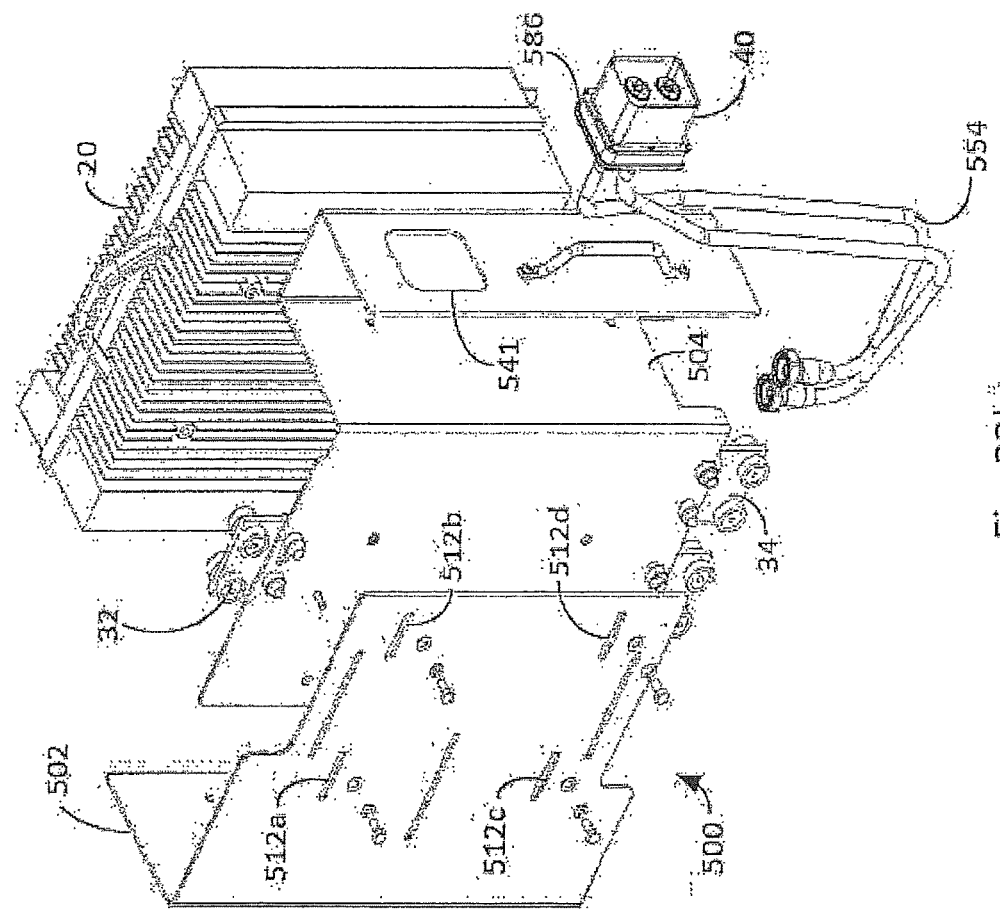
FIGS. 22a-22b illustrate an embodiment of an adjustable mount assembly that is rear mounted to a remote radio head.
Figure 22A:
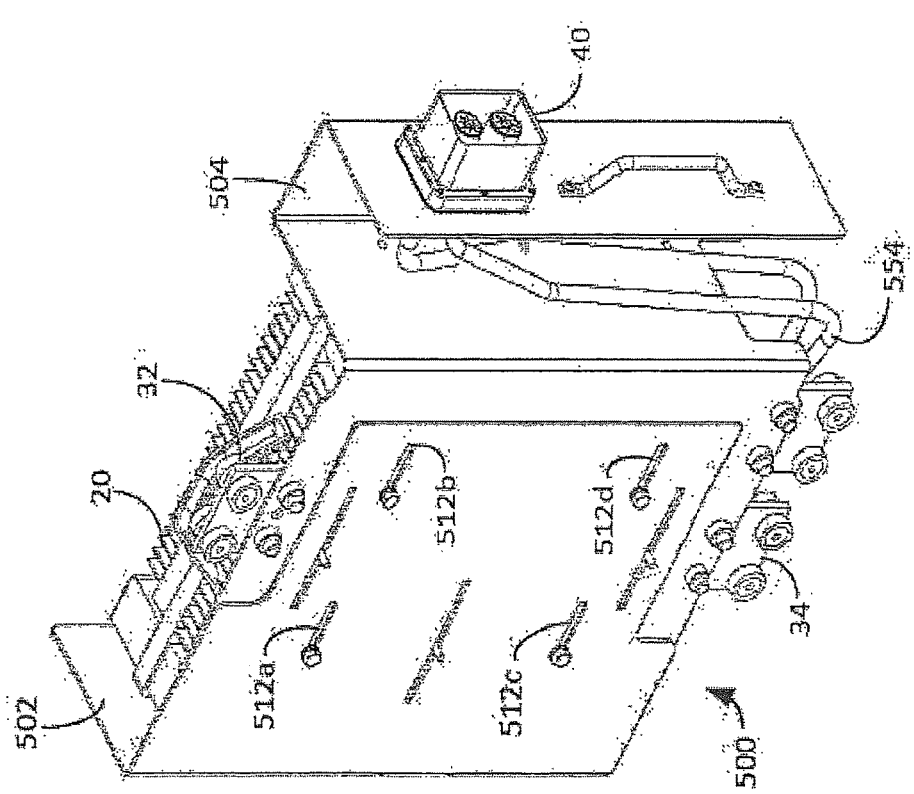
Figure 24:
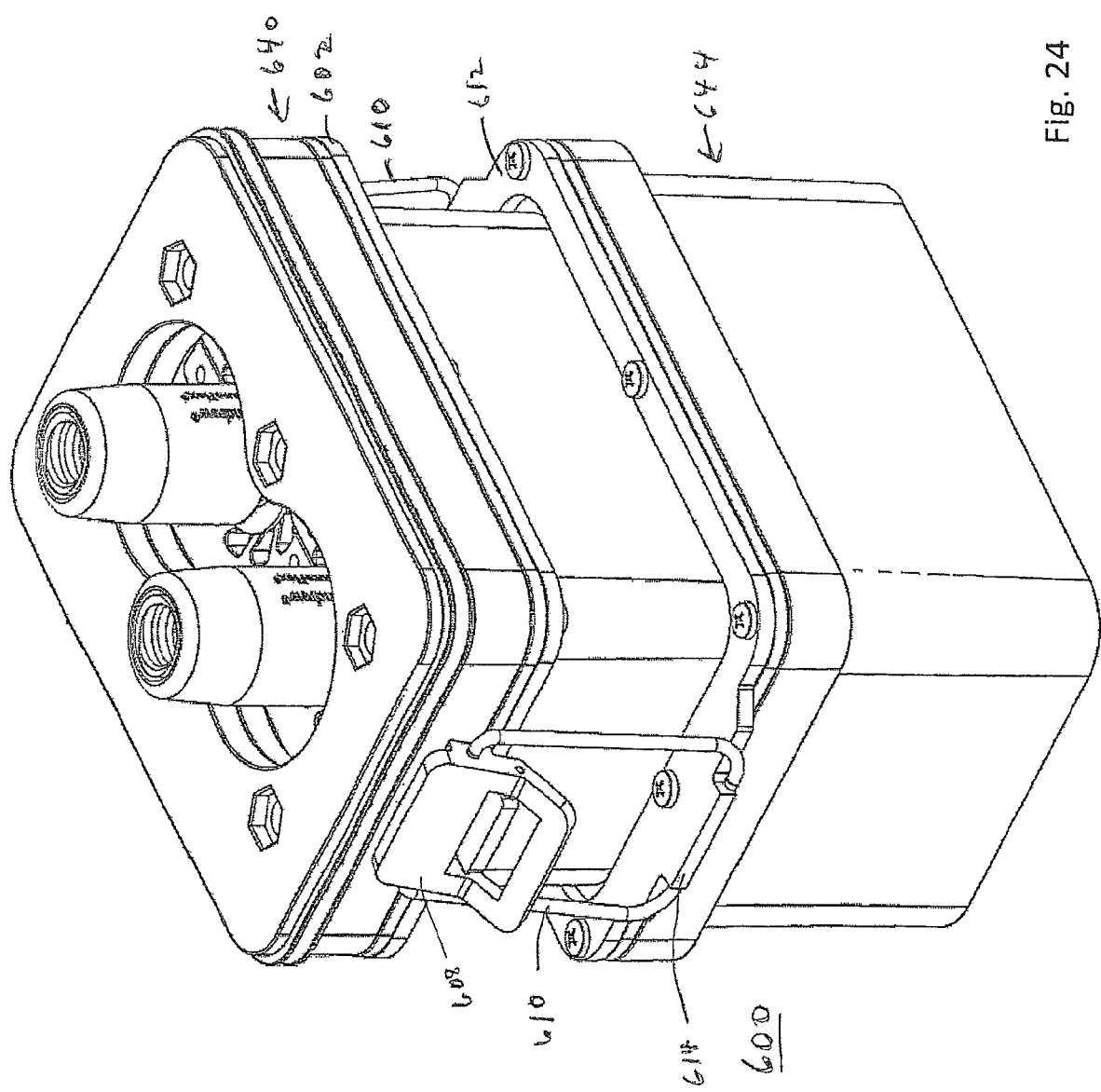
FIG. 24 is a perspective view of a blind mate capacitive RF connector with a latch mechanism according to the present invention.

FIGS. 22a, 22b, 23a and 23b illustrate an embodiment of an adjustable mount assembly 500 that may be side mounted or rear mounted to a RRH 20. In FIGS. 22a and 22b, the mount assembly 500 is rear mounted to a RRH 20. The mount assembly 500 includes a first bracket 502 and a second bracket 504. The first bracket 502 includes a first set of adjustable slots 512a, 512b, 512c and 512d. The first set of slots 512a, 512b, 512c and 512d may be dimensioned to receive hardware (such as screws) for securing the mount assembly 500 to the RRH 20 and also serve to fix the relative positions of brackets 502 and 504. By loosening and/or tightening the hardware, the relative positions of the brackets 502 and 504 may be adjusted to accommodate RRHs 40 of various size. Bracket 504 includes an opening 541 for receiving an RRH connector 40, such as the RRH connector shown in FIG. 18. The RRH connector 40 may be cabled to the RRH 20 by jumper cables 544. Jumper cables 554 may include metal-to-metal ohmic connectors on the one hand for attachment to the RRH 20 and capacitive connectors on the other hand for attachment to the RRH Connector 40. Bracket 504 also may include an Upper Low Friction Car 32 and/or a Lower Low Friction Car 34 that operate as described above with respect to FIGS. 3 and 4.

FIGS. 23a and 23b show the mount assembly 500 side mounted to a RRH 20. As illustrated, the first bracket 502 includes a second set of adjustable slots 514a, 514b and 514c for receiving mount posts 515a, 515b and 515c. Mount posts 515a, 515b and 515c may be, for example, threaded posts that can be used with appropriate hardware to secure the relative positions of brackets 502 and 504. Even if the assembly 500 is rear mounted to a RRH 20, mount posts 515a, 515b and 515c may help to align brackets 502 and 504 during assembly. Brackets 502 and 504 may also include a set of mounting points, such as apertures 516a, 516b and 516c for receiving hardware for side mounting the assembly 500 to the RRH 20. While FIGS. 22a, 22b, 23a and 23b illustrate an embodiment of an adjustable mount assembly 500 that may be side mounted or rear mounted to a RRH 20, mount assembly 500 may be modified to provide only side mounting, only rear mounting, or other functionality contemplated herein.

In practice, brackets 502 and 504, jumper cables 554, and RRH Connector 40 (including, for example, float gasket 86, float shells 84 and 88, float plate 70, capacitive connectors 66, and/or connector housing 90) may be assembled/mounted to an RRH 20 and/or fully tested offsite, such as an in a factory setting. This enables all ohmic connections (metal-to-metal) to be done in a controlled environment such as a the factory and performance tested before shipping a completed assembly to the field. In the field, the only RF connections that need to be made are the capacitive, which are more reliable and less likely to induce PIM.

The present invention is not limited to remote radio heads and antennas. Universal mounting brackets may also be used to mount additional items of tower-mountable equipment.

In another example, the standard interface structure mounts directly to the pole and allows the RRH and the antenna to straddle the pole. The standard interface structure includes an RF interconnection module, which is moved off to the side so it avoids the pole when the RRH and antenna are engaged. The RRH and Antenna mount directly to the standard interface structure, and each may be removed independently.

In another example, instead of mounting to a pole, the Standard Antenna Interface may replace a pole in a tower installation. In this example, the structure may comprise rectangular tubing or round tubing with an extended pipe tubing at both ends. The RF interconnect mates inside the center structure and is concealed within the structure when the antenna and RRH are installed.

In another example, additional functionality is added to the standard antenna interface by way of RF filtering and/or amplification. Additional modules, such as a tower mount amplifiers (TMA) or RF filters, may be added within the standard interface structure. These modules will contain an RF interconnection module on one or both sides, enabling it to directly connect to the antenna or RRH. The modules may be removable separate entities, or permanently embedded into the standard interface enclosure.

Figure 25:
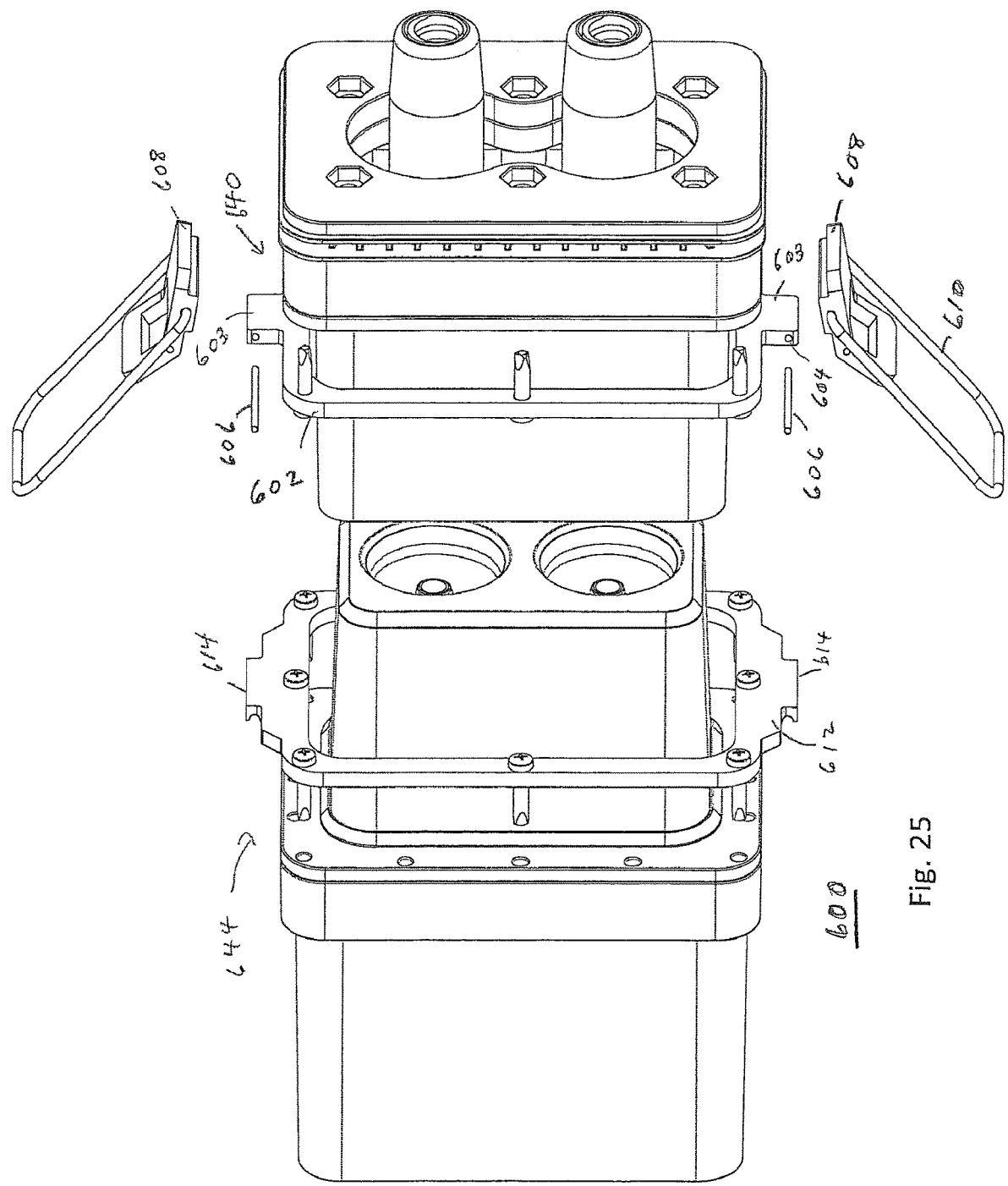
FIG. 25 is an exploded view of a blind mate capacitive RF connector with a latch mechanism according to the present invention.
Figure 27:
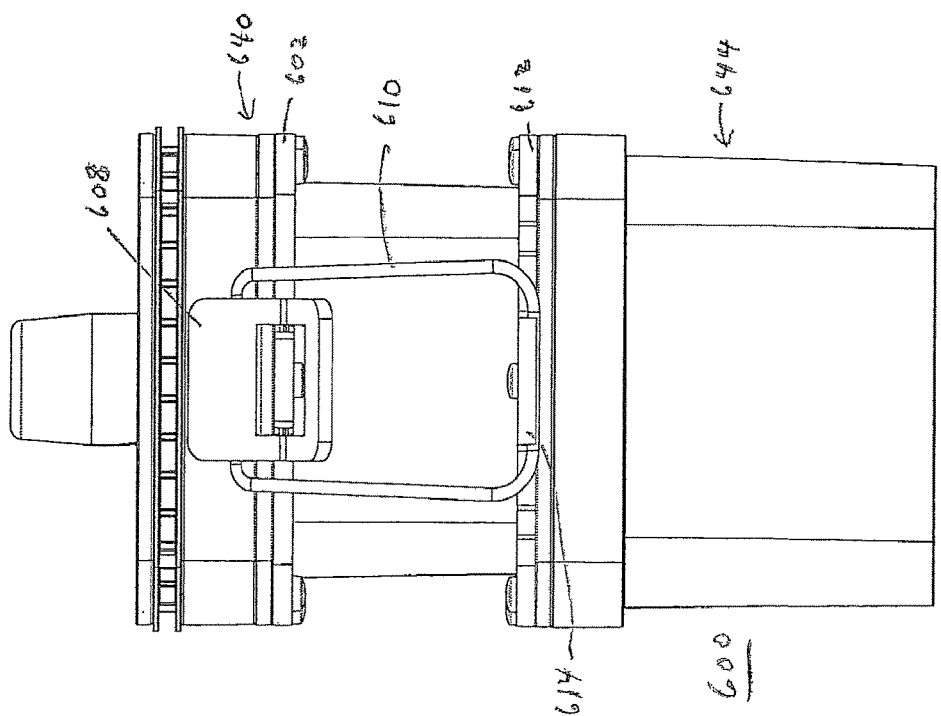
FIG. 27 is an end view of a blind mate capacitive RF connector with a latch mechanism according to the present invention.
Figure 26:
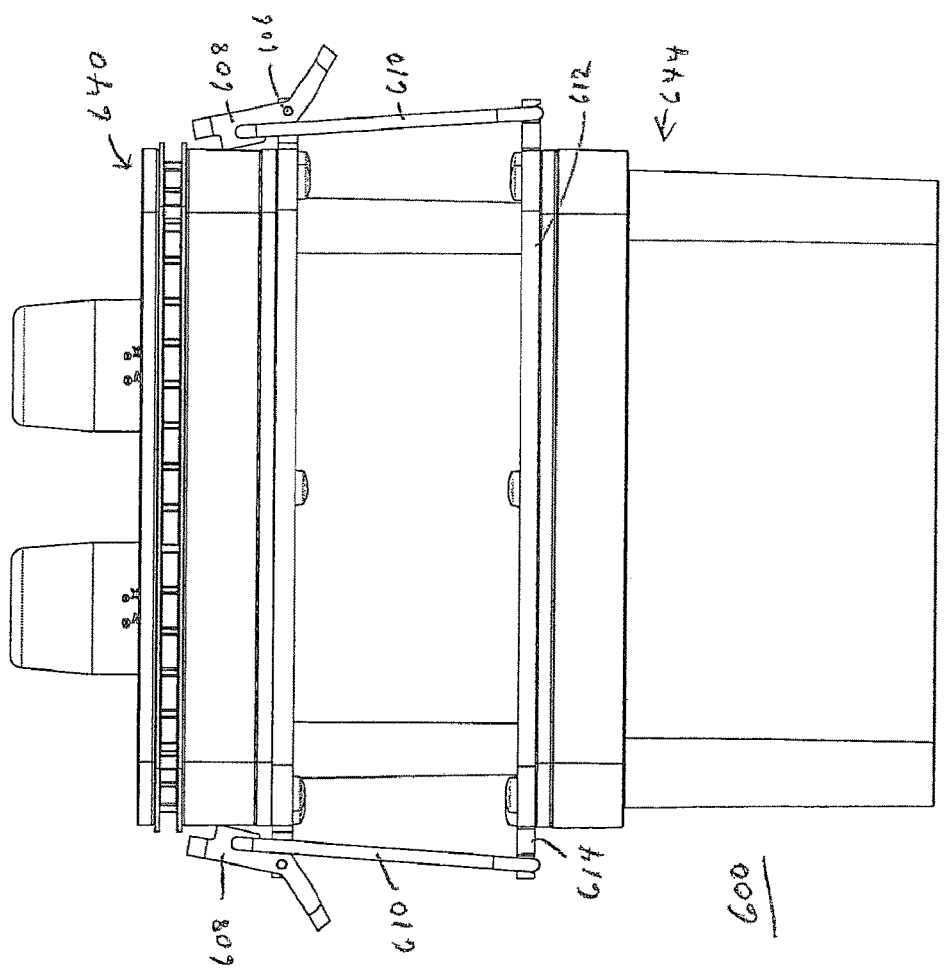
FIG. 26 is a side view of a blind mate capacitive RF connector with a latch mechanism according to the present invention.

Referring to FIGS. 24-27, an improved blind mate RF connector 600 suitable for the standard antenna interface with a latching structure is illustrated. Referring to FIG. 25, a first latch plate 602 is included on a first RF connector 640. The first latch plate 602 includes toggle mounts 603 each with an aperture 604 for inserting a pin 606. Toggles 608 are attached to the first latch plate 602 with pins 606 inserted through the aperture 604. Each toggle 608 also has a band 610, for example, composed of metal or other strong material.

A second latch plate 612 is included on the second blind mate RF connector 644. The second latch plate 612 includes tabs 614 configured to be engaged by the metal bands 610. The first and second plates 602, 612 are assembled to their respective connector housing with screws.

The metal band 610 is allowed to pivot on one end and latch the other end when under tension. When the first and second blind mate RF connectors 640, 644 are engaged, the metal band 610 may be hooked on the tab 614 and the toggle 608 may be rotated to the secured position. The toggle 608 rotates past 180 degrees to maintain latch tension. Such latches may be incorporated into any of the blind mate RF connectors illustrated in FIGS. 1-8, 10-19, and 22-23.

The latch structure prevents the blind mate RF connectors 640, 644 from disengaging during operation. This includes thermal cycling, vibration and other environmental effects.

An advantage of the present invention over known connector locking structures is that engagement force is distributed over two latches, improving reliability of the connection. Also, the latches may be disengaged one at a time, and, once disengaged, the latches do not have to be manipulated any further while the blind mate RF connectors are separated. This is particularly desirable when separating the blind mate RF connectors involves sliding potentially heavy equipment on a cellular base station tower.

Although embodiments of the present invention have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense and it is intended that the invention be limited only to the extent required by the appended claims and the applicable rules of law.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

What is claimed is:

1. A radiofrequency (RF) connector assembly comprising:
a first connector housing including a first RF connector disposed within the first connector housing;
a first latch plate, attached to the first connector housing, having first and second toggle mounts;
a first toggle attached to the first toggle mount by a first pin inserted into an aperture in the first toggle mount, wherein the first toggle includes a first pivotable band;
a second toggle attached to the second toggle mount by a second pin inserted into an aperture in the second toggle mount, wherein the second toggle includes a second pivotable band;
a second connector housing including a second RF connector disposed within the second connector housing, wherein the second RF connector is configured to mate with the first RF connector; and a second latch plate attached to the second connector housing, the second latch plate including first and second tabs configured to be engaged by the first pivotable band and the second pivotable band, respectively, wherein each of the first and second pivotable bands is configured to pivot on one end of the respective first and second toggles, wherein each of the first and second pivotable bands are configured to engage a respective one of the first and second tabs of the second latch plate under tension to latch the first and second connector housings into engagement by rotating about an axis of the respective pin to a secure position, and wherein the first and second toggles are each configured to rotate more than 180°.

2. The RF connector assembly of claim 1 wherein the first and second pivotable bands are metal bands.

3. The RF connector assembly of claim 1 wherein one of the first and second connector housings is incorporated into an antenna and wherein the other of the first and second connector housings is incorporated into antenna mountable equipment.

4. The RF connector assembly of claim 1 wherein the first and second RF connectors comprise a capacitive connector.

5. The RF connector assembly of claim 4 further comprising a float plate disposed in at least one of the first and second connector housings such that the capacitive connector is movably disposed in the float plate.

6. The RF connector assembly of claim 5 wherein the float plate is mounted to a back side of an antenna.

7. The RF connector assembly of claim 5 further comprising a float assembly having a float gasket attached at least one of the first and second connector housings to allow the at least one of the first and second connector housings to move with respect to a surface on which the at least one of the first and second connector housings is mounted.

8. The RF connector assembly of claim 1 wherein the first and second RF connectors are blind-mate connectors.

9. The RF connector assembly of claim 8 wherein the blind-mate connectors are coaxial.

10. A system comprising:

an antenna comprising a first connector housing, wherein the first connector housing includes a first radiofrequency (RF) connector disposed therein;

antenna mounted equipment comprising a second connector housing, wherein the second connector housing includes a second RF connector disposed therein, wherein the second RF connector is configured to mate with the first RF connector;

a first latch plate including first and second toggle mounts and attached to one of the first and second connector housings;

first and second toggles respectively attached to the first and second toggle mounts by respective pins inserted into respective apertures in each toggle mount, each of the first and second toggles including a pivotable band; and a second latch plate attached to the other of the first and second connector housings, the second latch plate including first and second tabs configured to be engaged by the pivotable band of the first toggle and the pivotable band of the second toggle, wherein the pivotable bands are each configured to pivot on one end of the respective first and second toggles, wherein the pivotable bands are each configured to engage a respective on of the first and second tabs of the second latch plate under tension to latch the first and second connector housings into engagement by rotating about an axis of the respective pin to a secure position, and wherein the first and second toggles are each configured to rotate more than 180°.

11. The system of claim 10, wherein each of the first and second RF connectors comprise a capacitive connector.

12. The system of claim 10, wherein each of the first and second RF connectors comprise a blind-mate connector.

13. A method comprising:

attaching a first latch plate to a first connector housing, wherein the first connector housing comprises a first capacitive radio frequency (RF) connector disposed therein, and wherein the first latch plate comprises first and second toggle mounts; and attaching a second latch plate to a second connector housing, wherein the second connector housing comprises a second capacitive RF connector disposed therein that is dimensioned to mate with the first RF connector and wherein the second latch plate includes first and second tabs that are dimensioned to be engaged by respective bands of first and second toggles that are attachable to the first and second toggle mounts, respectively, wherein at least one of the first and second connector housings includes a float plate disposed therein such that the capacitive RF connector disposed therein is movably disposed in the float plate.

14. The method of claim 13, further comprising:

attaching the first and second toggles to the first and second toggle mounts, respectively; and mating the first and second connector housings, wherein mating the first and second connector housings comprises engaging the first and second toggles with the first and second tabs, respectively.

15. The method of claim 14, wherein attaching the first and second toggle to the first and second toggle mounts, respectively, comprises inserting a respective pin into an aperture in each of the first and second toggle mounts, and wherein engaging the first and second toggles with the first and second tabs, respectively, comprises rotating the first and second toggles about the respective pins.

\* \* \* \* \*

UNITED STATES PATENT AND TRADEMARK OFFICE
CERTIFICATE OF CORRECTION

Page 1 of 1

PATENT NO. : 10,944,155 B2
APPLICATION NO. : 15/538284
DATED : March 9, 2021
INVENTOR(S) : Dickerson et al.

It is certified that error appears in the above-identified patent and that said Letters Patent is hereby corrected as shown below:

In the Claims

Column 12, Line 12, Claim 10: Please correct "a respective on" to read -- a respective one --

Signed and Sealed this
Twenty-ninth Day of June, 2021

Drew Hirshfeld
*Performing the Functions and Duties of the
Under Secretary of Commerce for Intellectual Property and
Director of the United States Patent and Trademark Office*